United States Patent
Kato et al.

(10) Patent No.: US 12,413,135 B2
(45) Date of Patent: Sep. 9, 2025

(54) DC POWER SUPPLY AND DISTRIBUTION SYSTEM

(71) Applicant: Mitsubishi Electric Corporation, Tokyo (JP)

(72) Inventors: Yusuke Kato, Tokyo (JP); Takuya Kataoka, Tokyo (JP); Tomoyuki Kawakami, Tokyo (JP); Kikuo Izumi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 214 days.

(21) Appl. No.: 18/276,045

(22) PCT Filed: Feb. 26, 2021

(86) PCT No.: PCT/JP2021/007333
§ 371 (c)(1),
(2) Date: Aug. 7, 2023

(87) PCT Pub. No.: WO2022/180781
PCT Pub. Date: Sep. 1, 2022

(65) Prior Publication Data
US 2024/0106316 A1    Mar. 28, 2024

(51) Int. Cl.
*H02M 1/00* (2007.01)
*H02M 3/155* (2006.01)
(Continued)

(52) U.S. Cl.
CPC ......... *H02M 1/007* (2021.05); *H02M 1/0032* (2021.05); *H02M 7/23* (2013.01);
(Continued)

(58) Field of Classification Search
CPC .... H02M 1/0032; H02M 1/007; H02M 3/155; H02M 3/335; H02M 7/08; H02M 7/23
See application file for complete search history.

(56) References Cited

U.S. PATENT DOCUMENTS

2007/0064363 A1* 3/2007 Nielsen ............... H02J 9/061
361/90
2019/0165614 A1* 5/2019 Afridi ................. H02M 7/23
(Continued)

FOREIGN PATENT DOCUMENTS

JP    H05-292750 A    11/1993
JP    2001-204137 A    7/2001
(Continued)

OTHER PUBLICATIONS

Japanese Office Action issued May 7, 2024, in corresponding Japanese Patent Application No. 2023-501949, 8pp.
(Continued)

*Primary Examiner* — Jue Zhang
(74) *Attorney, Agent, or Firm* — XSENSUS LLP

(57) ABSTRACT

A DC power supply and distribution system is obtained that improves power distribution efficiency at a low-load factor while suppressing overall upsizing. The DC power supply and distribution system includes a main AC/DC converter and an auxiliary AC/DC converter connected in parallel to the main AC/DC converter and having a rated power capacity smaller than that of the main AC/DC converter, wherein when the absolute value of the DC output power is smaller than the absolute value of a threshold power set smaller than the rated power capacity of the auxiliary AC/DC converter, a first switching command for switching from the first operation mode to the second operation mode is generated for a power conversion unit.

8 Claims, 16 Drawing Sheets

(51) Int. Cl.
  *H02M 3/335* (2006.01)
  *H02M 7/08* (2006.01)
  *H02M 7/23* (2006.01)

(52) U.S. Cl.
  CPC ............ *H02M 3/155* (2013.01); *H02M 3/335* (2013.01); *H02M 7/08* (2013.01)

(56) References Cited

U.S. PATENT DOCUMENTS

2019/0181773 A1* 6/2019 Kawai .................. H02J 3/38
2023/0072540 A1   3/2023 Kataoka et al.

FOREIGN PATENT DOCUMENTS

| JP | 2009-195079 A  | 8/2009  |
| JP | 2010-154613 A  | 7/2010  |
| JP | 4881940 B2     | 2/2012  |
| JP | 2012-095418 A  | 5/2012  |
| JP | 2012-244862 A  | 12/2012 |
| JP | 6771700 B1     | 10/2020 |
| WO | 2021/214851 A1 | 10/2021 |

OTHER PUBLICATIONS

International Search Report and Written Opinion mailed on May 18, 2021, received for PCT Application PCT/JP2021/007333, filed on Feb. 26, 2021, 12 pages including English Translation.

* cited by examiner

Amended FIG. 13

DC POWER SUPPLY AND DISTRIBUTION SYSTEM

CROSS-REFERENCE TO RELATED APPLICATION

The present application is based on PCT filing PCT/JP2021/007333, filed Feb. 26, 2021, the entire contents of which are incorporated herein by reference.

TECHNICAL FIELD

The present disclosure relates to a DC power supply and distribution system which supplies and distributes DC power to a load.

BACKGROUND ART

In recent years, photovoltaic power generation systems and battery storage systems and the like (hereinafter referred to simply as "DC power supply") have been widely installed in homes, office buildings, factories, railway stations, etc., to utilize natural energy and also to cope with power outages. In the DC power supply and distribution system, AC power from an AC system is converted to DC power by an AC/DC converter, and DC power outputted from a DC power supply is supplied to a load without being converted to AC power. Compared to an AC power supply and distribution system, the DC power supply and distribution system can reduce the power loss that occurs during power conversions more because the number of power conversions associated with charging the DC power supply and delivering power to the load can be reduced. In addition, the DC power supply and distribution system eliminates the need for an AC/DC converter for each load, making it simpler and more economical.

In some conventional DC power supply and distribution systems, a number of AC/DC converters are connected to each other in parallel for loads in order to ensure variable output capacity and thus high reliability (see, for example, Patent Document 1). Such a system includes N+1 AC/DC converters, where N is an integer of 1 or greater.

In general, however, when an AC/DC converter is operating at a low-load factor, an extra power loss is more likely to occur in the power conversion within the AC/DC converter, and therefore the power conversion efficiency is low. For example, the system described in Patent Document 2 measures the total current flowing through the AC/DC converters of the same capacity connected in parallel and controls them so as to minimise the number of AC/DC converters in operation in order to increase the load factors of the AC/DC converters in operation and thus improve the power conversion efficiency of the entire system.

PRIOR ART DOCUMENTS

Patent Document

[Patent Document 1] Japanese Unexamined Patent Application Publication No. 2009-195079
[Patent Document 2] Japanese Unexamined Patent Application Publication No. 2010-154613

SUMMARY OF THE INVENTION

Problems to be Solved by the Invention

However, technical attempts, as described in Patent Document 1, to ensure the converter capacity required by the DC power supply and distribution system by connecting a number of small-capacity AC/DC converters in parallel unfortunately result in an upsizing of the system.

On the other hand, technical attempts, as described in Patent Document 2, to configure the system with only a minimum number of large-capacity AC/DC converters connected in parallel also and unfortunately lead to the problem that reducing the number of AC/DC converters in operation at low-load factors results in only a small improvement in the load factors of the AC/DC converters in operation as well as in the power conversion efficiency.

The present disclosure is made to solve the above problem and aims at obtaining a DC power supply and distribution system that can improve power distribution efficiency when load factors are low, while suppressing upsizing of the entire DC power supply and distribution system.

Means for Solving Problem

The DC power supply and distribution system according to the present disclosure includes: a power conversion unit including a main AC/DC converter and an auxiliary AC/DC converter connected in parallel to the main AC/DC converter and characterized by a rated power capacity smaller than that of the main AC/DC converter for converting AC power inputted from an AC system into DC power to output it to a DC system; and a switching command generation unit for controlling the power conversion unit on the basis of DC output power outputted by the power conversion unit, wherein under an assumption that an operation mode in which the main AC/DC converter is in an operating state and the auxiliary AC/DC converter is in a stopped state is a first operation mode, and an operation mode in which the main AC/DC converter is in a stopped state and the auxiliary AC/DC converter is in an operating state is a second operation mode, when the power conversion unit is in the first operation mode and an absolute value of the DC output power outputted by the power conversion unit is smaller than an absolute value of a threshold power set smaller than the rated power capacity of the auxiliary AC/DC converter, the switching command generation unit generates, for the power conversion unit, a first switching command that is a switching command for switching from the first operation mode to the second operation mode.

Effects of the Invention

The DC power supply and distribution system according to the present disclosure can improve power distribution efficiency when the load factors are low while suppressing upsizing of the entire DC power supply and distribution system.

EMBODIMENTS FOR CARRYING OUT THE INVENTION

Embodiment 1

(Configuration of DC Power Supply and Distribution System 100)

Figure 1:
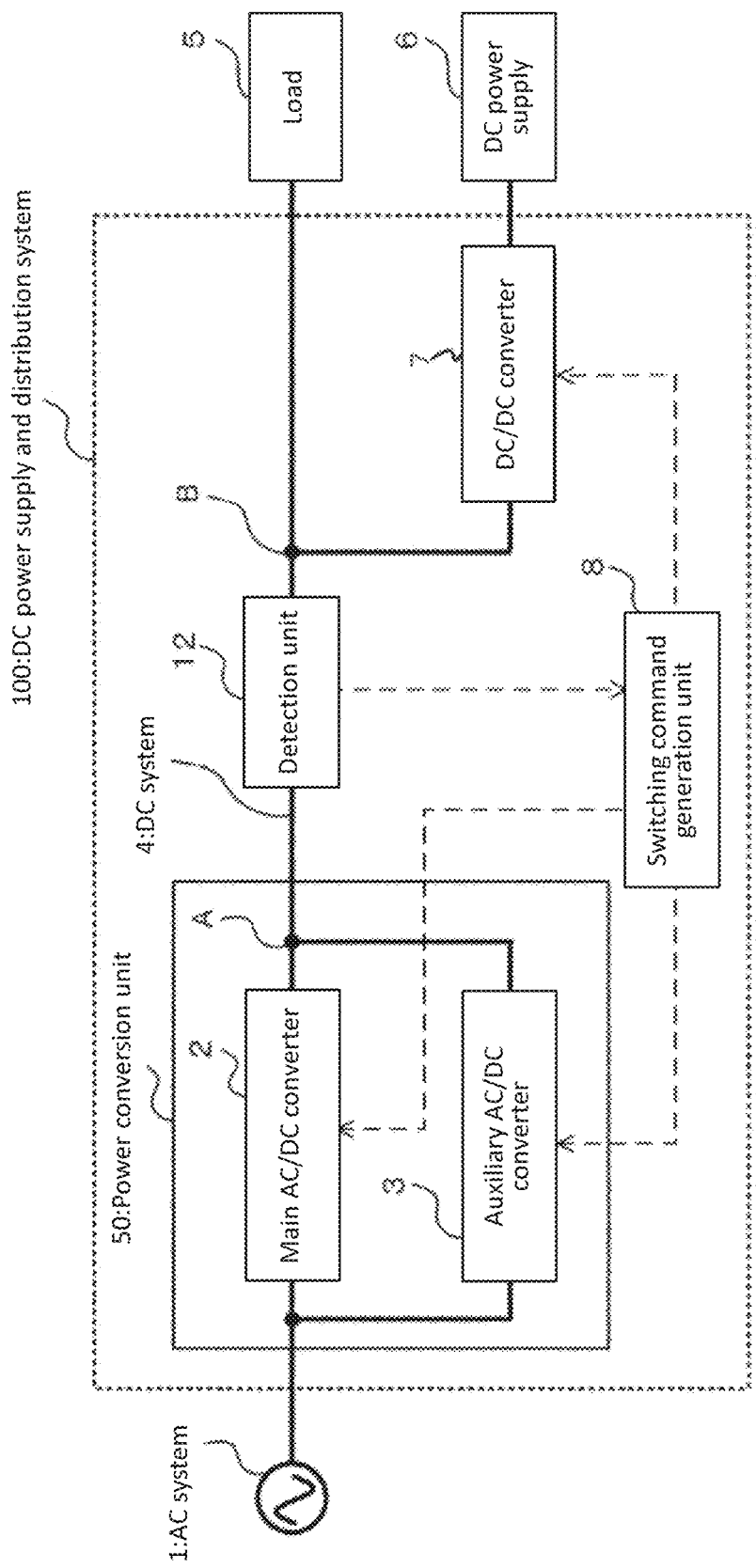
FIG. 1 is a schematic configuration diagram of a DC power supply and distribution system according to Embodiment 1 of the present disclosure.

FIG. 1 is a schematic configuration diagram of a DC power supply and distribution system 100 according to Embodiment 1 of the present disclosure. The DC power supply and distribution system 100 includes a DC/DC converter 7, a switching command generation unit 8, a detection unit 12, and a power conversion unit 50. The DC power supply and distribution system 100 is used, for example, in homes, office buildings, factories, and station buildings. The DC power supply and distribution system 100 is configured to be able to perform "power operation", in which electricity is purchased from an AC system 1 to supply to a load 5 and a DC power supply 6, and "regenerative operation", in which electricity generated by the load 5 and the DC power supply 6 is sold to the AC system 1. The AC system 1 is, for example, an AC power source for supplying power to the DC power supply and distribution system 100 via an AC power receiving facility from a commercial power system, which is provided by a power company to supply commercial power.

The load 5 includes a single load or a plurality of loads. The DC power supply 6 includes a photovoltaic unit, a storage battery, and other devices, and can discharge power to and charge power from the DC system 4. The storage battery can be a stationary storage battery or a storage battery installed in a mobile system such as a car, bus, or truck that is currently ready to be charged or discharged by the DC system 4.

As shown in FIG. 1, the DC power supply and distribution system 100 is a system for supplying the power outputted from the AC system 1 and the DC power supply 6 to the load 5, which may include a plurality of loads. In FIG. 1, the AC power line from the AC system 1 to the power conversion unit 50 is represented by a single straight line, but in reality, it is composed of, for example, a single-phase three-wire line or a three-phase three-wire line. Also, in FIG. 1, the DC system 4 is represented by a single straight line, but in reality, it is composed of a pair of electric lines consisting of, for example, a wire on the positive side and a wire on the negative side.

The power conversion unit 50 includes a main AC/DC converter 2 and an auxiliary AC/DC converter that is connected in parallel with the main AC/DC converter 2 and has a smaller rated power capacity than the main AC/DC converter. The power conversion unit 50 converts AC power from the AC system 1 to DC power and outputs it to the DC system 4. The main AC/DC converter 2 and the auxiliary AC/DC converter 3 are connected to each other at a connection point A on the DC system 4. The DC/DC converter 7 is connected to a connection point B on the DC system 4. The power outputted to the DC system 4 is supplied to the load 5 and, via the DC/DC converter 7, also to the DC power supply 6.

The detection unit 12 detects a voltage in the DC system 4 as well as a current and a power outputted from the power conversion unit 50. More particularly, the detection unit 12 includes a voltage sensor unit for detecting a voltage in the DC system 4 (hereinafter referred to as the DC system voltage), a current sensor unit for measuring an output current from the power conversion unit 50, and a power calculation unit for calculating a DC output power from the power conversion unit 50 using the DC system voltage and the output current.

The switching command generation unit 8 determines whether a switching command is required for an operation mode of the power conversion unit 50 on the basis of the DC output power detected by the detection unit 12 and generates a switching command for the power conversion unit 50 if a switching command is required. The switching command generation unit 8 gives an instruction to change parameters (voltage thresholds) to control the DC/DC converter 7 in accordance with the switching command for the operation mode, the details of which will be described later. The operation mode of the power conversion unit 50 includes Operation Mode 1 (first operation mode) and Operation Mode 2 (second operation mode).

"Operation Mode 1" is an operation mode in which the main AC/DC converter 2 is in an operating state, and the auxiliary AC/DC converter 3 is in a stopped state.

"Operation Mode 2" is an operation mode in which the main AC/DC converter 2 is in a stopped state, and the auxiliary AC/DC converter 3 is in an operating state.

More particularly, when the DC output power is lower than a threshold power (to be detailed later) set below a rated power capacity of the auxiliary AC/DC converter and the power conversion unit 50 is in Operation Mode 1, then the switching command generation unit 8 generates a switching command (first switching command) for the power conversion unit 50 to switch from Operation Mode 1 to Operation Mode 2. On the other hand, when the DC output power is equal to or greater than the threshold power and the power conversion unit 50 is in Operation Mode 2, then the switching command generation unit 8 generates a second switching command for the power conversion unit 50 to switch from Operation Mode 2 to Operation Mode 1.

Here, the effect of the DC power supply and distribution system 100 according to the present disclosure will be briefly described. The DC power supply and distribution system 100 includes the two AC/DC converters having different rated power capacities, wherein, when the DC output power is lower than the threshold power, that is, when the power conversion unit 50 is operating in its low-load range, then the switching command generation unit 8 generates a switching command for the power conversion unit 50 to switch from Operation Mode 1 to Operation Mode 2. Thus, in the low-load range, the auxiliary AC/DC converter 3 is used instead of the main AC/DC converter 2. This results in an increase in the load factor relative to the rated power, thus improving the conversion efficiency compared to the case where the main AC/DC converter 2 is used.

Although the detection unit 12 is located between the connection point A and the connection point B in FIG. 1, it can be located at any position as long as it can measure the output current and output power outputted by the power conversion unit 50 and the voltage in the DC system 4.

Although it is described above, as an example, that the current sensor unit, the voltage sensor unit, and the power calculation unit of the detection unit 12 are arranged to share one block, they may be distributed in different other blocks. For example, a configuration is also possible in which the current sensor unit and the voltage sensor unit are integrated into a sensor unit provided in the DC/DC converter 7 (or sensor units provided in the main AC/DC converter 2 and the auxiliary AC/DC converter 3), and the power calculation unit is integrated into a controller (not shown) that controls the DC power supply and distribution system 100. Furthermore, although it is described above that the common current sensor unit measures the output current of the power conversion unit 50, a sum of an output current measured by a current sensor unit provided in the main AC/DC converter 2 and an output current measured by a current sensor unit provided in the auxiliary AC/DC converter 3 can be used as the output current of the power conversion unit 50.

Although FIG. 1 does not show a transformer to insulate the DC power supply and distribution system 100 from the AC system 1, a transformer may be installed if insulation from the AC system 1 is required.

The power consumption of the load 5 varies depending on an operating condition of the load 5. If the operating state of the load 5 is constant, the power consumption of the load 5 varies little. Therefore, during a period when the variation of the operating state of the load 5 is small, a voltage to be applied to the DC system 4 may be changed and adjusted from a normal voltage applied to the DC system 4 in order to reduce power loss in a power circuit or an input interface unit of the load 5. This reduces the power consumption of the load 5 compared to that before the voltage adjustment in the DC system 4. In the adjustment above, the voltage in the DC system 4 should be limited to within an input voltage range determined for each device constituting the load 5. This prevents the load 5 from being unable to operate normally even when the voltage in the DC system 4 is adjusted as described above.

The switching command generation unit 8 may be configured as part of the controller that controls the entire of the DC power supply and distribution system 100, or as part of the function of a control unit of each converter.

(Configuration of AC/DC Converter)

Figure 2:
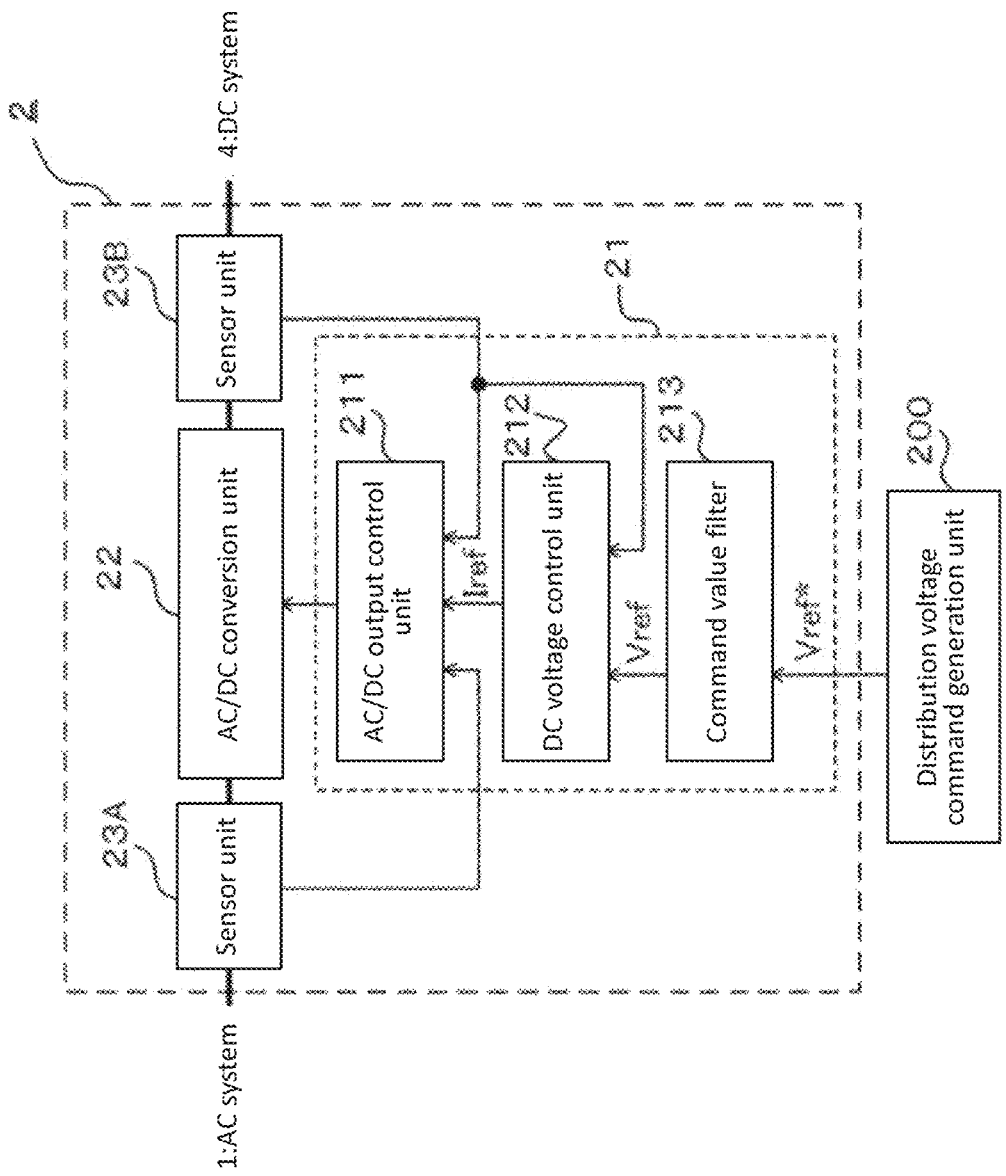
FIG. 2 is a schematic configuration diagram of an AC/DC converter and a distribution voltage command generation unit of the DC power supply and distribution system according to Embodiment 1 of the present disclosure.

Next, the main AC/DC converter 2 and the auxiliary AC/DC converter 3 shown in FIG. 1 will be described with reference to FIG. 2. FIG. 2 is a schematic configuration diagram of an AC/DC converter and a distribution voltage command generation unit 200 of the DC power supply and distribution system 100 according to Embodiment 1 of the present disclosure. In Embodiment 1, the main AC/DC converter 2 and the auxiliary AC/DC converter 3 are simply referred to as "AC/DC converter(s)" when it is not necessary to describe their configurations separately from each other because some of their functions are the same.

The AC/DC converter includes: an AC/DC conversion unit 22 that converts AC power from the AC system 1 to DC power; a sensor unit 23A that measures a current and a voltage between the AC system 1 and the AC/DC converter; a sensor unit 23B that detects a voltage and a current between the DC system 4 and the AC/DC converter; an AC/DC conversion control unit 21 that controls the AC/DC converter on the basis of the measurement results of the sensor units 23A and 23B and command values generated by the distribution voltage command generation unit 200.

The AC/DC conversion control unit 21 determines an operation command for the AC/DC conversion unit 22 on the basis of an output current command Iref outputted from a DC voltage control unit 212 and power information (such as voltages and currents of the AC system 1 and the DC system 4) detected by the sensor units 23A and 23B.

Each component of the AC/DC conversion control unit 21 will be described in detail below. The AC/DC conversion control unit 21 includes an AC/DC output control unit 211, the DC voltage control unit 212, and a command value filter 213.

The AC/DC output control unit 211 controls the operation of the AC/DC conversion unit 22 on the basis of the measured values by the sensor units 23A and 23B and the output current command Iref.

The command value filter 213 performs filtering processing (for example, low-pass filtering) on the distribution voltage command Vref* outputted from the distribution voltage command generation unit 200. In the following, the distribution voltage commands before and after the filtering processing may be distinguished as "Vref*" and "Vref", respectively.

If a range of the variation of the distribution voltage command Vref* outputted from the distribution voltage command generation unit 200 is large, the operation of the AC/DC converter may cause the voltage in the DC system 4 to overshoot. As described above, the low-pass filtering of the distribution voltage command Vref* using the command value filter 213 suppresses the above-mentioned variation of the distribution voltage command Vref and thus prevents the voltage in the DC system 4 from overshooting. In a case where a control response of the AC/DC conversion unit 22 is small and thus there is no concern about overshooting, the command value filter 213 may be dispensed with. The time constant of the low-pass filter, included in the command value filter 213, is adjusted and set in advance in accordance with the control characteristics (specifications) of the AC/DC converter.

The DC voltage control unit 212 generates a value of the current command Iref of the AC/DC conversion unit 22 on the basis of the voltage in the DC system 4 obtained via the sensor unit 23B and the distribution voltage command Vref. A drooping characteristic may be given to the power command or the current command outputted from the DC voltage control unit 212. This makes it possible to control the measurement errors of current, voltage, etc. when operating a plurality of AC/DC converters connected in parallel. This also makes it possible to control output unbalance due to variations in line impedance between the plurality of AC/DC converters.

Although FIG. 2 shows the distribution voltage command generation unit 200 outside the AC/DC converter as an example, it may be provided inside the AC/DC converter.

(Configuration of DC/DC Converter)

Figure 3:
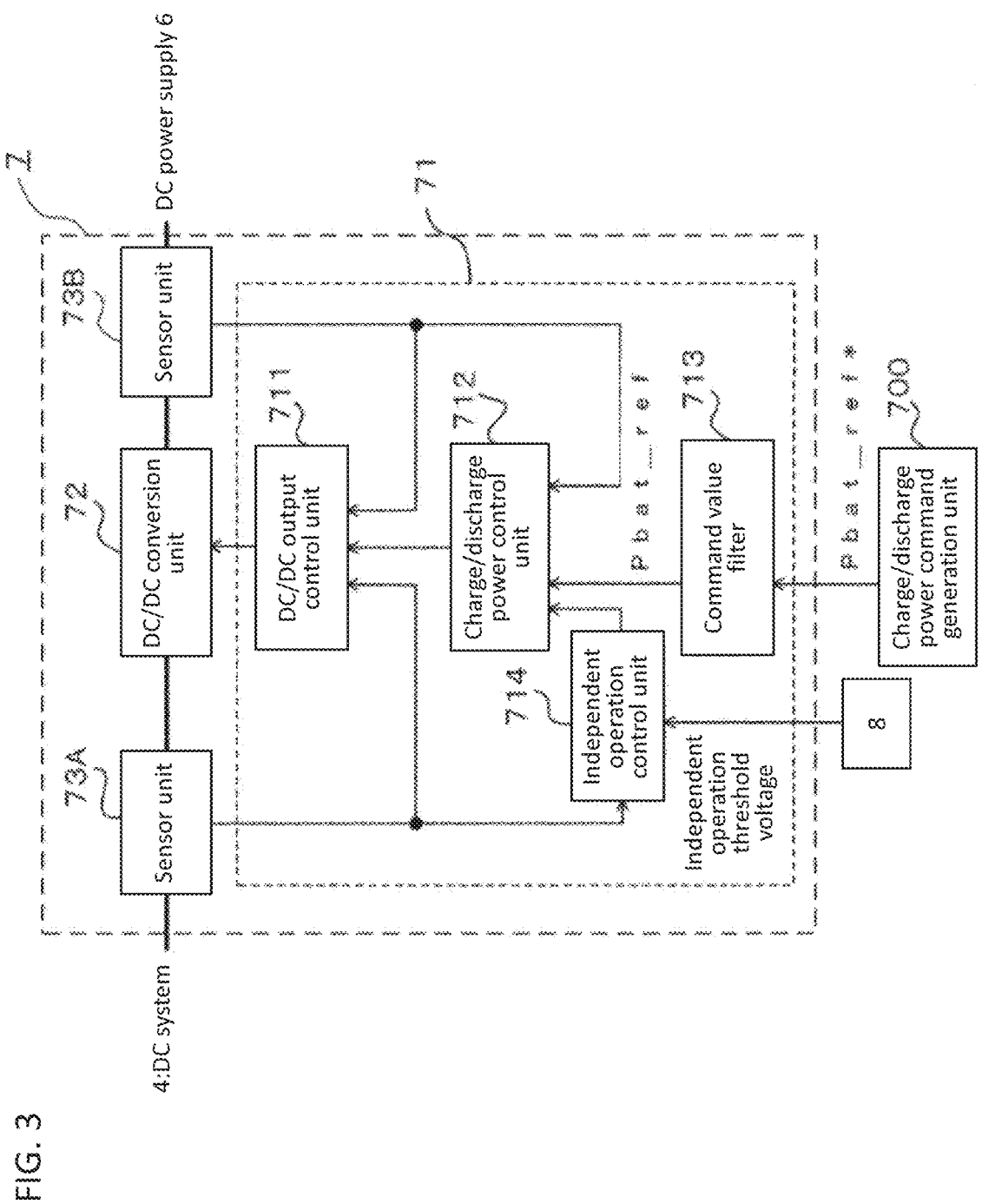
FIG. 3 is a schematic configuration diagram of a DC/DC converter and a charge/discharge power command generation unit of the DC power supply and distribution system according to Embodiment 1 of the present disclosure.
Figure 4:
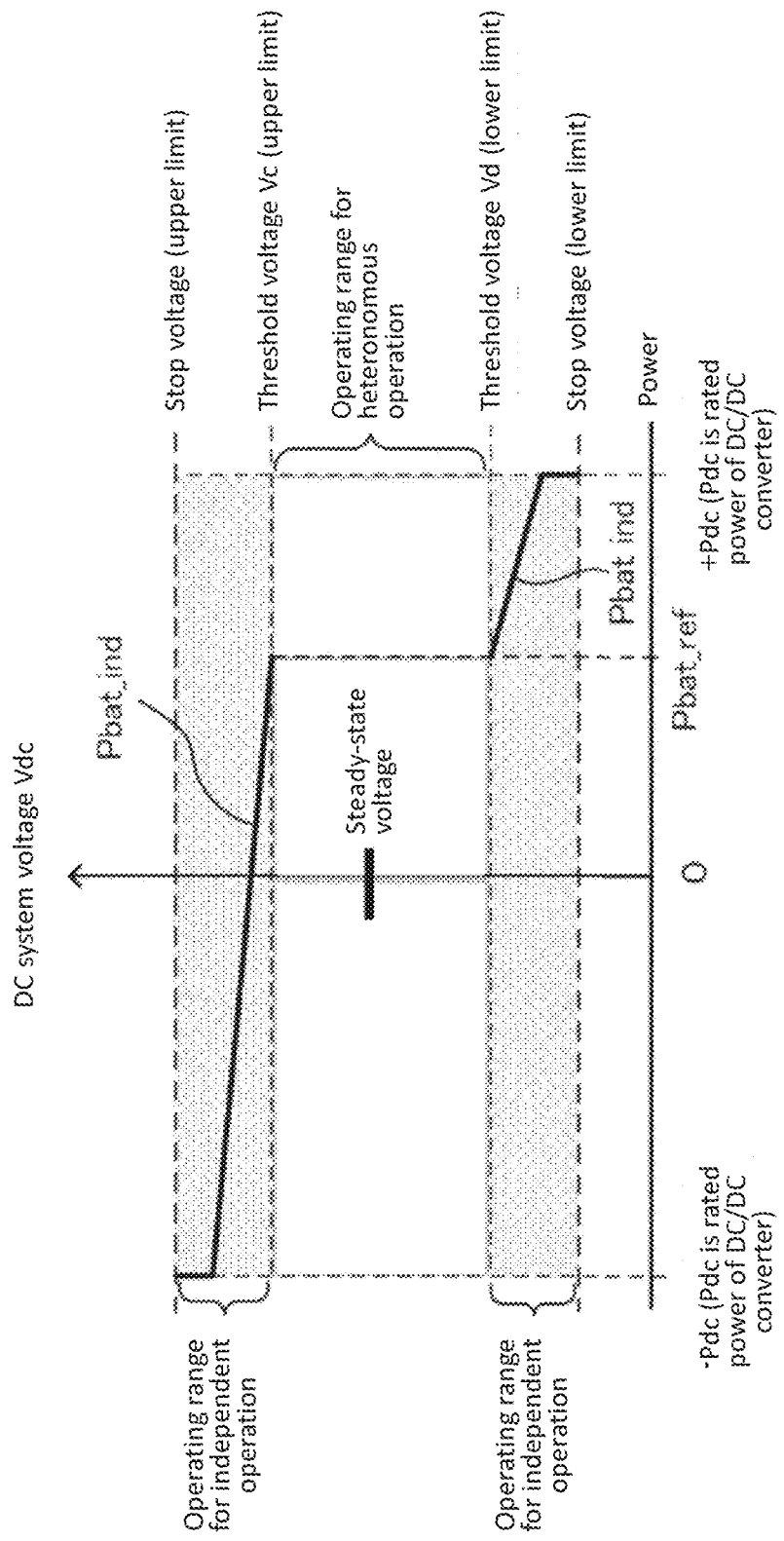
FIG. 4 is a characteristic diagram to illustrate independent operation control of the DC/DC converter according to Embodiment 1 of the present disclosure.

Next, the DC/DC converter 7 shown in FIG. 1 will be described with reference to FIGS. 3 and 4. FIG. 3 is a schematic configuration diagram of the DC/DC converter 7 and the charge/discharge power command generation unit 700 of the DC power supply and distribution system 100 according to Embodiment 1 of the present disclosure. FIG. 4 is a characteristic diagram to illustrate independent operation control of the DC/DC converter 7 according to Embodiment 1 of the present disclosure. In FIG. 4, the vertical axis represents measured voltage values of the DC system 4 (hereinafter referred to as DC system voltage Vdc), and the horizontal axis represents output powers of the DC/DC converter 7. In the horizontal axis, the direction in which the power is outputted to the DC system 4 is the positive direction.

As shown in FIG. 3, the DC/DC converter 7 includes a DC/DC conversion unit 72 (corresponding to a first DC/DC conversion unit) connected to the DC system 4 and the DC power supply 6 to perform power conversion, sensor units 73A and 73B, and a DC/DC conversion control unit 71.

The sensor unit 73A detects a voltage and a current between the DC system 4 and the DC/DC conversion unit 72. The sensor unit 73B detects a voltage and a current between the DC power supply 6 and the DC/DC conversion unit 72. The DC/DC conversion control unit 71 generates a power command on the DC/DC conversion unit 72 to control it.

More particularly, when the voltage in the DC system 4 goes out of a first voltage range which corresponds to the operating range for a heteronomous operation in FIG. 4, that is, the voltage range above Vd and below Vc, where Vd and Vc are the thresholds for an independent operation, the DC/DC conversion control unit 71 controls the DC/DC conversion unit 72 to supply the charge/discharge power from the DC power supply 6 to the DC system 4 so as to bring the voltage in the DC system 4 within the first voltage range (the operating range for the heteronomous operation).

The DC/DC conversion control unit 71 includes a DC/DC output control unit 711, a charge/discharge power control unit 712, a command value filter 713, and an independent operation control unit 714.

The command value filter 713 performs the low-pass filtering on a command value as the command value filter 213 shown in FIG. 2 does. In particular, the command value filter 713 performs the low-pass filtering on a charge/discharge power command Pbat_ref* outputted from the charge/discharge power command generation unit 700 to generate a charge/discharge power command Pbat_ref. As with the command value filter 213, the command value filter 713 is provided to prevent the DC system 4 from overshooting in sudden change of the commands. However, if there is no concern about overshooting, it may be dispensed with.

In the DC power supply and distribution system 100 according to the present embodiment, the charge/discharge power command Pbat_ref is generated by the charge/discharge power command generation unit 700 on the basis of a state of the DC power supply 6 (charge and discharge capacity, remaining power, a state of health), an operating state of the load 5, and a condition of the power conversion unit 50. For example, if the DC power supply 6 is a storage battery such as a secondary battery, State Of Charge (SOC), State Of Health (SOH) and so forth of the storage battery are considered. Although the charge/discharge power command generation unit 700 is shown outside the DC/DC converter 7 as an example in FIG. 3, it may be provided to a controller inside the DC/DC converter 7.

The charge/discharge power control unit 712 generates a value of an output current command Idc_ref on the basis of the measured values of the sensor units 73A and 73B and a charge power command Pbat_ref (or an independent operation charge/discharge power command Pbat_ind to be described later).

The DC/DC output control unit 711 determines an operation command for the DC/DC conversion unit 72 on the basis of the value of the output current command Idc_ref from the charge/discharge power control unit 712 and the measured values of the sensor units 73A and 73B.

The independent operation control unit 714 performs the following: (1) determining whether the independent operation is required on the basis of an independent operation characteristic diagram shown in FIG. 4 and the voltage in the DC system 4, and (2) calculating the independent operation charge/discharge power command Pbat_ind and outputting it to the charge/discharge power control unit 712 when it is determined that the independent operation is required.

The above-mentioned determination of whether or not the independent operation is required will be described next. There are two operation modes of the DC/DC converter 7, namely, "a heteronomous operation mode" and "an independent operation mode". The independent operation control unit 714 determines the need for the independent operation, to be detailed below. In determining the need for the independent operation, it is determined whether the DC system voltage Vdc is within the operating range for the heteronomous operation, which can be rephrased as whether a relationship Vd<Vdc<Vc holds. That is, the operating range for the heteronomous operation is a voltage range where the DC system voltage Vdc is greater than the independent operation threshold voltage Vd and smaller than the independent operation threshold voltage Vc.

More particularly, in the above-mentioned need determination, when the DC system voltage Vdc is in the outside of the operating range for the heteronomous operation where the relationship Vd<Vdc<Vc holds, in other words, when the DC system voltage Vdc is in the inside of the operating range for the independent operation (FIG. 4), the independent operation control unit 714 calculates the independent operation charge/discharge power command Pbat_ind. The independent operation charge/discharge power command Pbat_ind is used by the charge/discharge power control unit 712 to generate a control command. This allows the DC/DC converter 7 to be controlled in the independent operation mode so that the DC system voltage Vdc is brought within the operating range for the heteronomous operation where the relationship Vd<Vdc<Vc holds. As a result, the DC system voltage Vdc is controlled because the charge/discharge power is supplied from the DC power supply 6 to the DC system 1 via the DC/DC converter 7.

On the other hand, when it is determined, in the need determination for the independent operation, that the DC system voltage Vdc is within the operating range for the heteronomous operation where the relationship Vd<Vdc<Vc holds, there is no need for the independent operation where the DC system voltage Vdc is to be adjusted by the charge/discharge power supplied from the DC power supply 6 and thus the DC/DC converter 7 is controlled in the heteronomous operation mode. Thus, the charge/discharge power control unit 712 uses the charge/discharge power command Pbat_ref generated by the charge/discharge power command generation unit 700.

Considering a case where the DC system voltage Vdc is in the vicinity of the threshold voltages, hysteresis may be provided for the threshold voltages Vc and Vd. This prevents mode hunting, in which the DC/DC converter 7 frequently switches between "the heteronomous operation mode" and "the independent operation mode".

An example of the relationship between the independent operation charge/discharge power command Pbat_ind and the charge/discharge power command Pbat_ref when the DC system voltage Vdc is changed will be described below with reference to FIG. 4. When the DC system voltage Vdc equals the threshold voltage Vc or Vd, the independent operation charge/discharge power command Pbat_ind is equal to the charge/discharge power command Pbat_ref. The independent operation charge/discharge power command Pbat_ind is characterized so as to output, in the voltage range lower than the threshold voltage Vd, a greater power to the DC system 4 as the DC system voltage Vdc goes down, in order to prevent the DC system voltage Vdc from decreasing. The maximum of the output power depends on the rated power Pdc of the DC/DC converter 7. On the other hand, in the voltage range above the threshold voltage Vc, the output power to the DC system 4 is decreased as the DC system voltage Vdc increases. The independent operation charge/discharge power command Pbat_ind is characterized so as to charge power to the DC power supply 6 if the DC system voltage Vdc still does not go down.

If the DC system voltage Vdc falls below a stop voltage (lower limit) or exceeds another stop voltage (upper limit) in FIG. 4, the DC power supply and distribution system 100 stops. In the independent operation mode, if the variation of the DC system voltage Vdc cannot be suppressed even if the DC/DC converter 7 continues to output the rated power, which is the maximum output power, the DC power supply and distribution system 100 stops.

(Operation)

The following is a brief description of an operation of the DC power supply and distribution system 100. The DC power supply and distribution system 100 is typically designed and operated to reduce the amount of power to be purchased from the AC system 1 in order to conserve energy. As a result, when a substantial portion of the power required for the load 5 is supplied by the DC power supply 6, the power conversion unit 50 is more frequently operated in a state in which the amount of power supplied by the power conversion unit 50 is small, in other words, in a condition in which the load factor of the power conversion unit 50 is low. For example, in some cases, the number of operations at a load factor as low as about ⅓ of the rated power of the main AC/DC converter 2 accounts for more than 60% of the number of operations in a given period. On the other hand, it is difficult to significantly reduce the rated power capacity of the main AC/DC converter 2 because the power conversion unit 50 must provide both the load power and the charging power when the DC power supply 6 cannot generate power.

Figure 5:
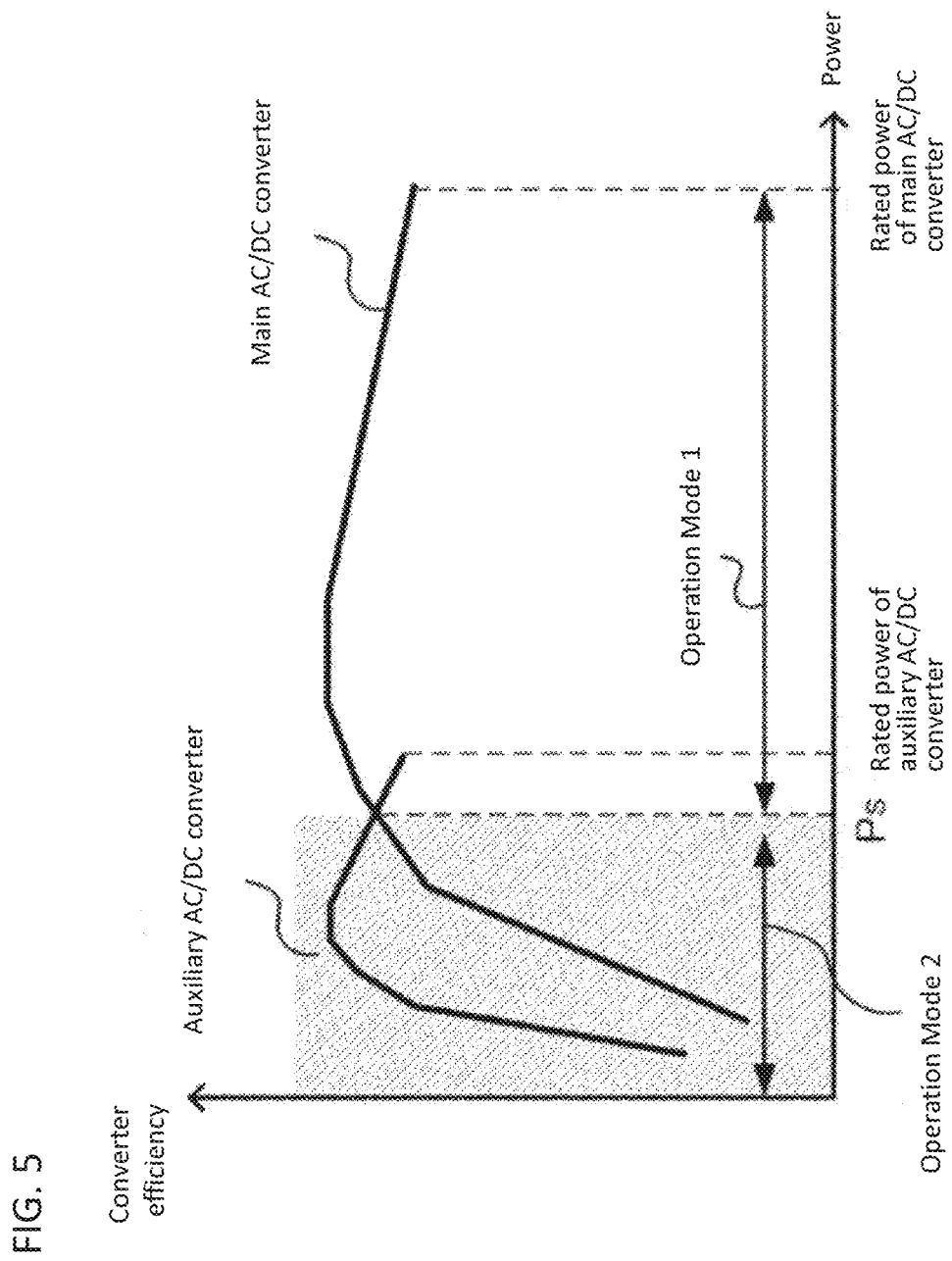
FIG. 5 is a characteristic diagram to illustrate power conversion efficiency of a main AC/DC converter and an auxiliary AC/DC converter according to Embodiment 1 of the present disclosure.

FIG. 5 is a characteristic diagram to illustrate power conversion efficiency of the main AC/DC converter 2 and the auxiliary AC/DC converter 3. In the figure, the vertical axis represents the converter efficiency of the AC/DC converters, and the horizontal axis represents the power that the AC/DC converters can convert. In general, the efficiency of AC/DC converters decreases in the low load factor range. The trend is generally more pronounced in ranges where the load factor is between 20% and 30% or less. The reasons why the efficiency of AC/DC converters decreases significantly in the range where the load factor is below 20% to 30% or less are as follows. Examples of fixed losses, independent of the load factor, include: a loss in a power supply circuit; a loss due to a cooling fan; a loss due to reactor loss; and a loss due to switching of a switching device. Due to these fixed losses, the ratio of the power loss to the above input and output power increases as the load factor decreases. Among the fixed losses, the reactor loss and the switching loss increase as the switching frequency within the AC/DC converter increases. The cooling fan loss increases as the heat generated by the AC/DC converter increases. This is because cooling the increased heat requires an increase in both the cooling capacity and the number of the cooling fans to provide more cooling power.

The present disclosure improves the efficiency of power distribution when the load factor is low while suppressing upsizing of the entire DC power supply and distribution system by making the rated output capacity of the auxiliary AC/DC converter 3 smaller than that of the main AC/DC converter 2 (for example, about ⅓) and by controlling the switching of the operation modes (to be detailed below) between the main AC/DC converter 2 and the auxiliary AC/DC converter 3.

The output current of the auxiliary AC/DC converter 3 is low because the rated output capacity of the auxiliary AC/DC converter 3 is configured to be lower than that of the main AC/DC converter 2. Since the output current of the auxiliary AC/DC converter 3 is low, the current withstanding capability of the reactor can be reduced. This allows downsizing of the power conversion unit 50 including the auxiliary AC/DC converter 3. In addition, the lower output current effectively suppresses heat generation from the AC/DC converter, reducing the cooling fan loss. For the above reasons, the DC power supply and distribution system 100 according to the present embodiment is effective in improving the conversion efficiency of the AC/DC converters. In addition, the auxiliary AC/DC converter 3 can be provided at a lower cost than the main AC/DC converter 2 because the lower output current of the auxiliary AC/DC converter 3 helps to reduce its component cost.

The switching frequency of the auxiliary AC/DC converter 3 set lower than that of the main AC/DC converter 2 causes the ripple width of the current flowing through the reactor to increase.

Therefore, it is necessary to suppress the ripple width of the current by increasing the L-value of the reactor but increasing the L-value of the reactor leads to an upsizing of the reactor. On the other hand, as described above, in the DC power supply and distribution system according to the present embodiment, the auxiliary AC/DC converter 3 can be downsized by reducing the current withstanding capability of the reactor of the auxiliary AC/DC converter 3. As a result, even after taking all the factors above into account, it is possible to avoid increasing the overall size of the reactor. A low switching frequency suppresses the reactor loss and the switching loss, allowing efficiency to be improved when the load factor is low.

From the above, in the low-load range where the rated power of the auxiliary AC/DC converter 3 is smaller than, for example, ⅓ of the rated power of the main AC/DC converter 2, the auxiliary AC/DC converter 3 can achieve a higher conversion efficiency than the main AC/DC converter 2. Therefore, the system efficiency of the DC power supply and distribution system 100 can be improved by operating the power conversion unit 50 in Operation Mode 2.

Figure 6:
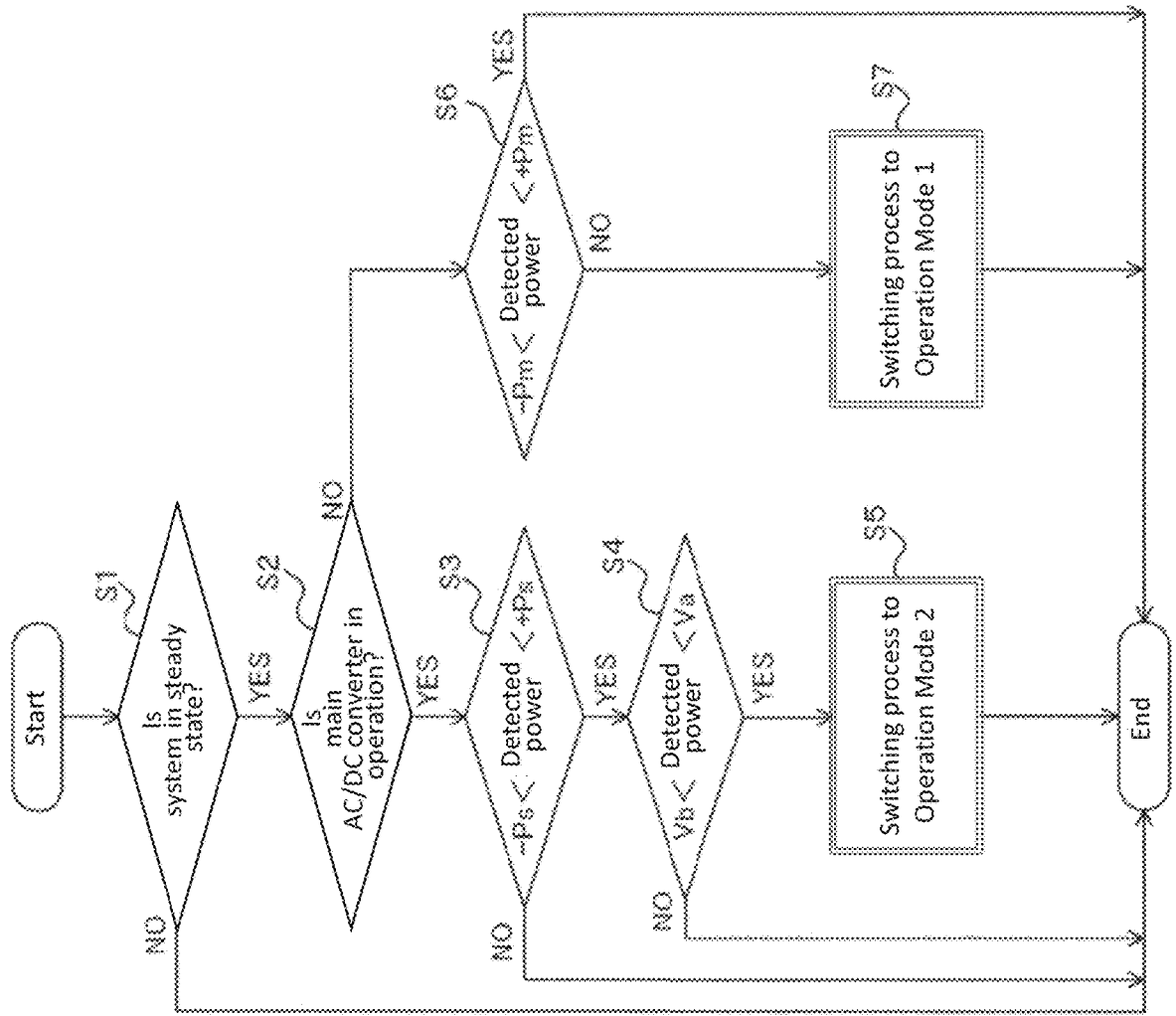
FIG. 6 is a flowchart to illustrate control of the DC power supply and distribution system according to Embodiment 1 of the present disclosure.
Figure 7:
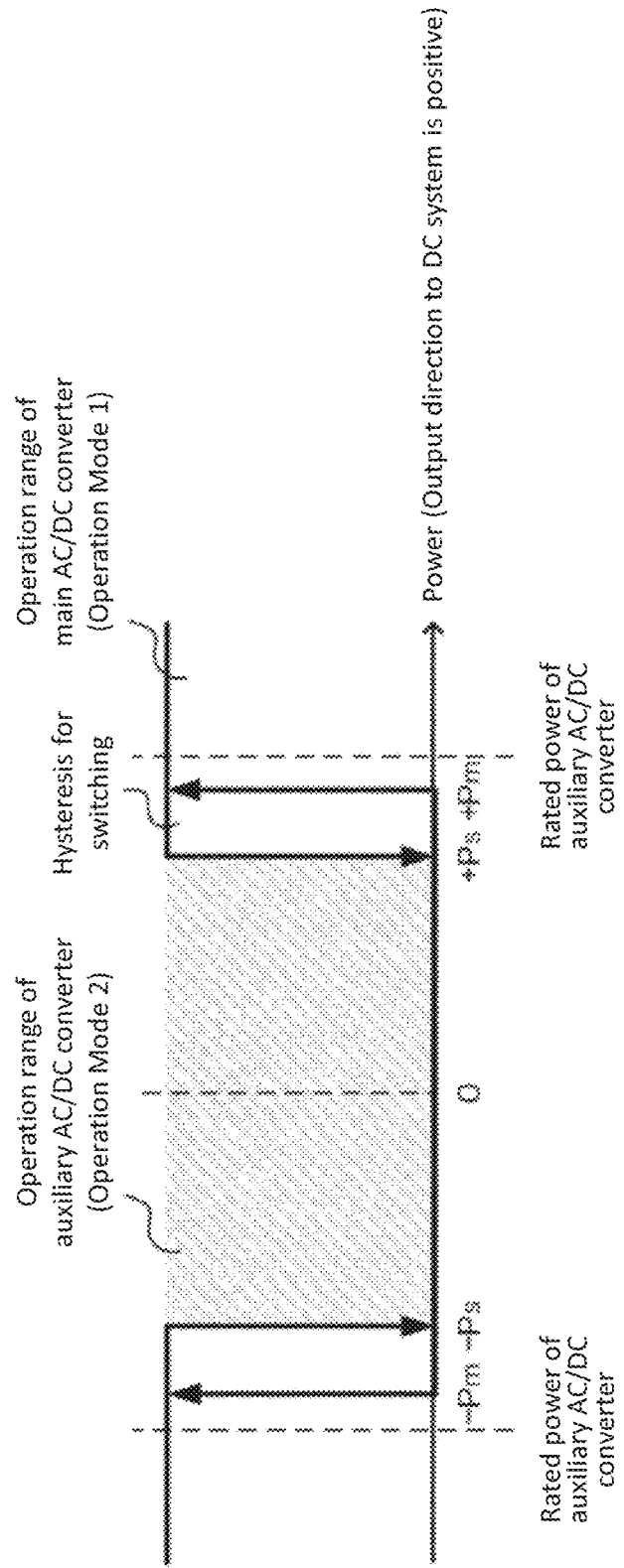
FIG. 7 is an explanatory diagram to illustrate switching thresholds of the main AC/DC converter and the auxiliary AC/DC converter according to Embodiment 1 of the present disclosure.
Figure 8:
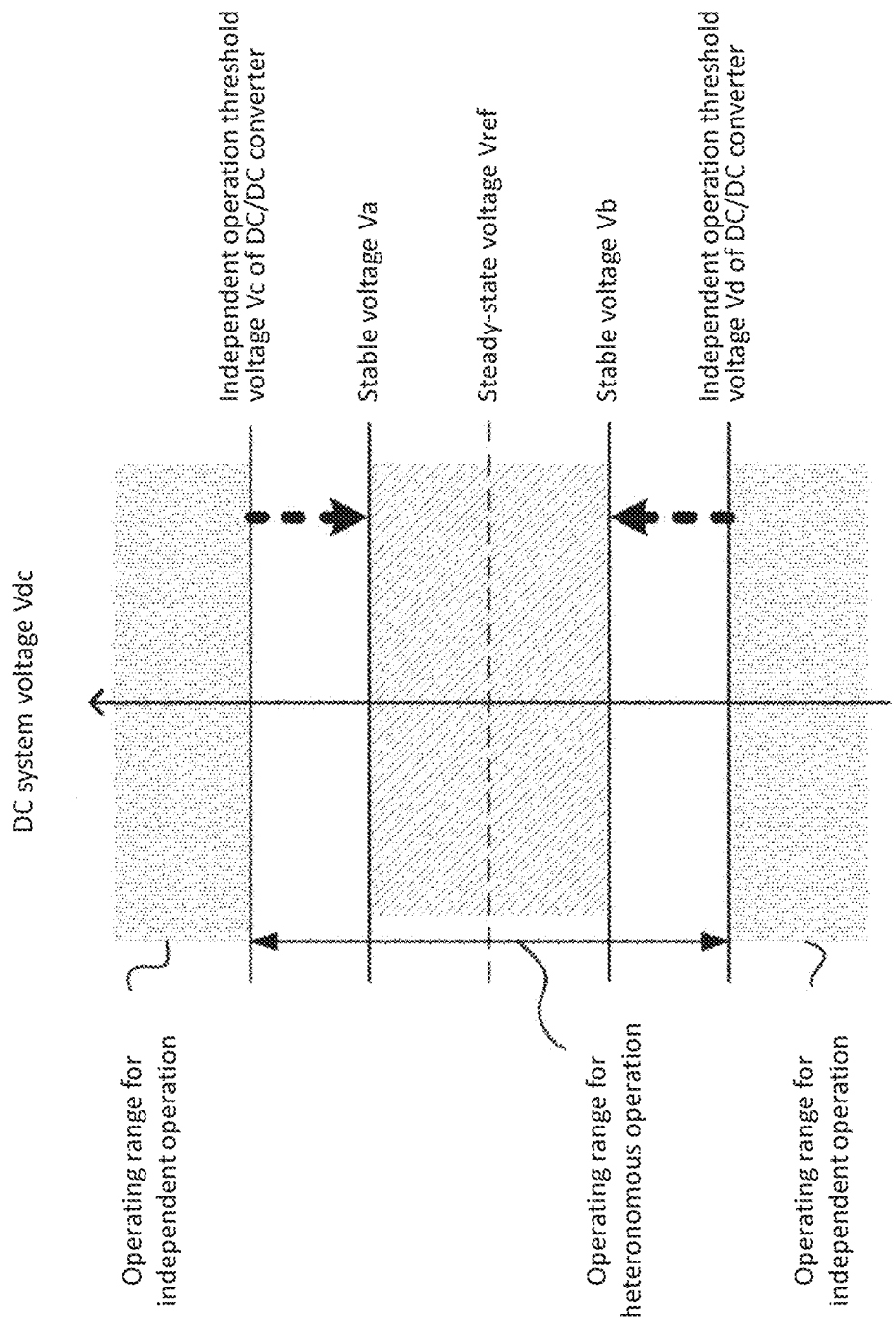
FIG. 8 is an explanatory diagram to illustrate the control of the DC power supply and distribution system according to Embodiment 1 of the present disclosure.

The following is a detailed description, provided with reference to FIGS. 6 through 8, of a procedure of a switching process of the operation modes of the power conversion unit 50 performed by the switching command generation unit 8. FIG. 6 illustrates a process flow according to Embodiment 1 of the present disclosure. FIG. 7 is an explanatory diagram to illustrate switching thresholds of the main AC/DC converter 2 and the auxiliary AC/DC converter 3 according to Embodiment 1 of the present disclosure. FIG. 8 is an explanatory diagram to illustrate a voltage control of the DC system 4 of the DC power supply and distribution system 100 according to Embodiment 1 of the present disclosure.

The switching command generation unit 8 determines whether the DC power supply and distribution system 100 is in a steady state in Step S1 after the processing flow starts. The switching command generation unit 8 terminates the flow of the switching process when the DC power supply and distribution system 100 is not in a steady state, such as in the process of start-up and shut-down.

If the DC power supply and distribution system 100 is in a steady state, the process proceeds to Step S2, where the switching command generation unit 8 checks the operation mode of the power conversion unit 50. If the main AC/DC converter 2 is in the operating state, i.e., in Operation Mode 1 (Step S2: YES), the process proceeds to Step S3; if the main AC/DC converter 2 is in the stopped state, i.e., in Operation Mode 2 (Step S2: NO), the process proceeds to Step S6.

In Step S3, the switching command generation unit 8 makes the determinations described below using an output DC power of the power conversion unit 50, which may be referred to as P50 hereinafter, detected by the detection unit 12 and the threshold powers. First, in Step S3, the switching command generation unit 8 determines whether the output DC power P50 is within the range of the threshold power +Ps to the threshold power −Ps, that is, whether a relationship −Ps<P50<+Ps holds. Here, the direction of supplying power from the power conversion unit 50 to the DC system 4 (power operation) is denoted as +(positive) direction; and the direction of supplying power from the DC system 4 to the AC system 1 (regenerating operation) is denoted as − (negative) direction.

Similarly, in Step S6, the switching command generation unit 8 determines whether a relationship −Pm<P50<+Pm holds using the output DC power P50, a threshold power+Pm, and a threshold power−Pm. The threshold powers Ps and Pm described above are set below the rated output power of the auxiliary AC/DC converter 3. The threshold powers Ps and Pm include the threshold power Ps (which is a first threshold power) used to generate the first switching command indicative of switching from Operation Mode 1 to Operation Mode 2, and the threshold power Pm (which is a second threshold power) used to generate the second switching command indicative of switching from Operation Mode 2 to Operation Mode 1. The threshold powers Ps and Pm may be set so that a relationship Ps<Pm holds, as shown in FIG. 7.

In other words, the absolute value of the threshold power Pm (the second threshold power) may be set greater than the absolute value of the threshold power Ps (the first threshold power).

This provides hysteresis to prevent the mode hunting when switching between Operation Mode 1 and Operation Mode 2.

The output DC power P50 to be used in Steps S3 and S6 should be a filtered value to eliminate the influence of the noise it contains. The influence of the noise may be eliminated by methods other than filtering, such as determining that these conditional formulas are satisfied when they hold continuously for some period of time. The conditional formulas −Ps<P50<+Ps and −Pm<P50<+Pm can be replaced by −Ps≤P50≤+Ps and −Pm≤P50≤+Pm, respectively, where P50 can take the exact values of the threshold powers.

In Step S3, the switching command generation unit 8 advances the process to Step S4 if a relationship −Ps<P50<+Ps holds (YES). If the above relationship does not hold (NO) in Step S3, the switching process flow is terminated. That is, it is determined that although the current operation mode is Operation Mode 1 in which the main AC/DC converter 2 is operating, the operation mode should not be switched because the load factor of the main AC/DC converter 2 is not low.

In Step S4, the switching command generation unit 8 determines whether the DC system voltage Vdc detected by the detection unit 12 is within a stable voltage range, that is, whether a relationship Vb<Vdc<Va holds. The stable voltages Va and Vb are set to indicate a voltage range within which the DC system voltage Vdc fits when the system is in a stable operating state with respect to the distribution voltage command Vref, which is a steady-state voltage of the DC system 4, and also the sensor errors are within a normal range. The stable voltage Va is smaller than or equal to the upper limit of the voltage at which the load can operate, and the stable voltage Vb is greater than or equal to the lower limit of the voltage at which the load can operate. In Step S4, if the DC system voltage Vdc is within the stable voltage range (YES) where a relationship Vb<Vdc<Va holds, the process proceeds to Step S5 to switch the operation to Operation Mode 2. On the other hand, in Step S4, if the DC system voltage Vdc is outside the stable voltage range (NO), the switching process flow shown in FIG. 6 is terminated.

In Step S4, it is checked whether the DC system voltage Vdc is within the stable voltage range in order to avoid the risk, such as operation mode hunting, due to the instability of the power balance and its control within the DC power supply and distribution system 100, which may occur if the voltage Vdc is outside the stable voltage range even when the relationship −Ps<P50<+Ps holds.

In Step S5, the switching command generation unit 8 performs the control processing to switch the operation to Operation Mode 2 via the DC/DC conversion control unit 71, and then terminates the flow.

In Step S6, if the relationship −Pm<P50<+Pm does not hold (NO), the process proceeds to Step S7, where the operation of the power conversion unit 50 is switched from Operation Mode 2 to Operation Mode 1, and the flow is terminated. On the other hand, if the conditional formula of Step 6 holds (YES), the switching process flow is terminated.

Figure 9:
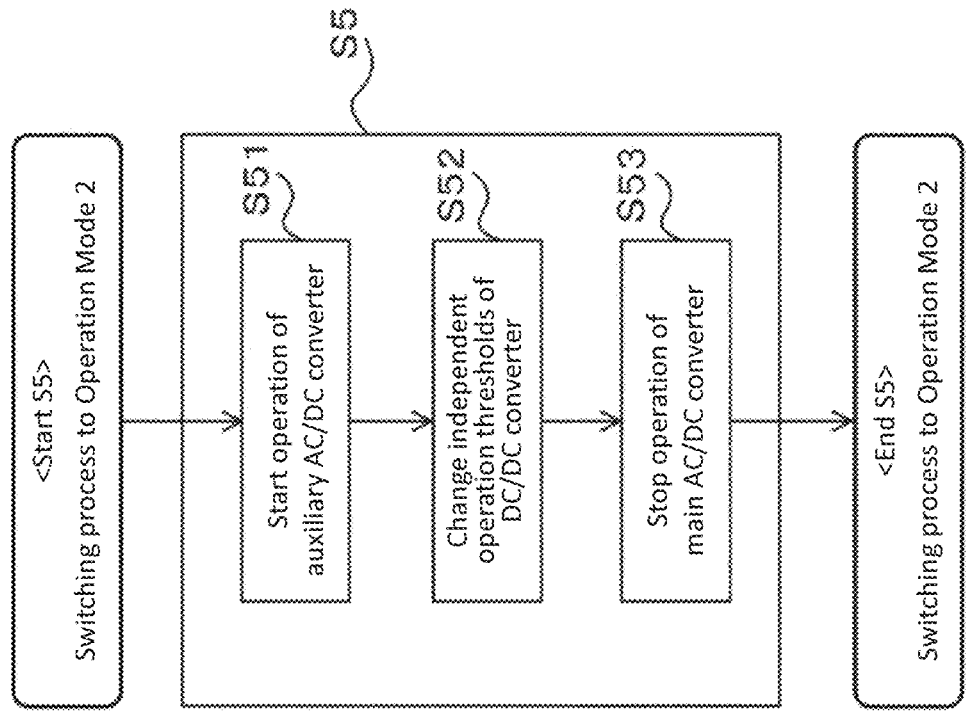
FIG. 9 is a flowchart to detail "switching process to Operation Mode 2" in Step S5 of FIG. 6.

Here, the processing of Step S5 will be described in detail with reference to FIG. 9. FIG. 9 is a flowchart to detail "the switching process to Operation Mode 2" in Step S5.

First, in Step S51, the auxiliary AC/DC converter 3 starts its operation.

Next, in Step S52, if the absolute value of the DC output power outputted by the power conversion unit 50 is smaller than the absolute value of the threshold power Ps, the switching command generation unit 8 changes, as shown in FIG. 8, the independent operation thresholds Vc and Vd of the DC/DC converter 7 to Va and Vb (or the values closer to them), respectively, that is, the switching command generation unit 8 instructs the DC/DC conversion control unit 71 to set a voltage range narrower than the first voltage range—which is the voltage range used for determining whether the independent operation is required—as the first voltage range.

In the switching process (S5) from Operation Mode 1 to Operation Mode 2, in Step S52, the independent operation threshold Vc (lower limit) is brought closer to the stable voltage Va (lower limit) and the independent operation threshold Vd (upper limit) is brought closer to the stable voltage Vb (upper limit).

As indicated by the dashed arrows in FIG. 8, this means that the voltage range corresponding to the operating range for the independent operation is made wider. This facilitates the DC/DC converter 7 entering the independent operation mode.

This facilitates access to power support from the DC power supply 6, thereby preventing a shortage of power supply to the load and overpowering of the auxiliary AC/DC converter 3 in the event that the variation of the DC system voltage Vdc due to a sudden change of the load and a sudden change of the charge/discharge power of the DC power supply 6 in Operation Mode 2 cannot be controlled by the auxiliary AC/DC converter 3 alone.

Finally, in Step S53, the operation of the main AC/DC converter 2 is stopped. For example, the stopping of the operation of the main AC/DC converter 2 (Step S53) may be caused by turning off a switching device included in the AC/DC conversion unit 22. The main power supply of the main AC/DC converter 2 may be turned off to reduce the standby power consumption, but when the power demand of the load 5 increases, it takes a long time to start the main AC/DC converter 2. Therefore, the main AC/DC converter 2 may be put into the standby mode by leaving its main power supply ON and only its switching device OFF. This reduces the time required for the main AC/DC converter 2 to start from the stopped state.

Figure 10:
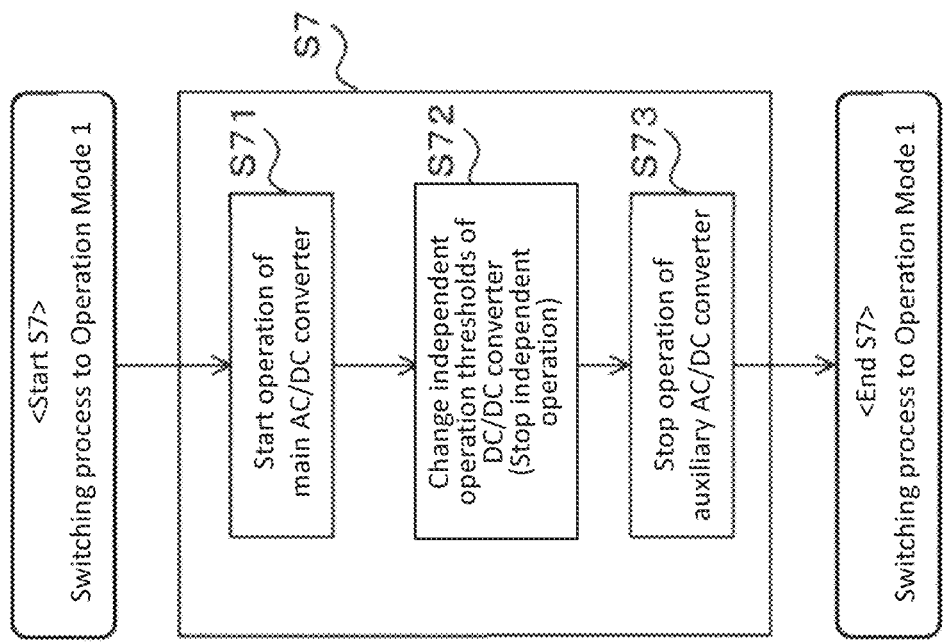
FIG. 10 is a flowchart to detail "switching process to Operation Mode 1" in Step S7 of FIG. 6.

Step S7 will be described in detail with reference to FIG. 10. FIG. 10 is a flowchart to detail "the switching process to Operation Mode 1" in Step S7 shown in FIG. 6. In the figure, first, in Step S71, the main AC/DC converter 2 starts its operation. Next, in Step S72, the switching command generation unit 8 changes the independent operation thresholds of the DC/DC converter 7 from the stable voltages Va and Vb to the independent operation thresholds Vc and Vd, which are the values for the normal operation, respectively. In other words, the switching command generation unit 8 instructs the DC/DC conversion control unit 71 to set the first voltage range, which is the voltage range to determine the need for the independent operation, wider than it has been set. Even when the DC system voltage Vdc varies due to the variation of the load state, the DC power supply and distribution system 100 can be operated in a stable manner because the switching command generation unit 8 controls the DC system voltage Vdc within a range close to the steady-state voltage by the above process. Finally, in Step S73, the switching command generation unit 8 causes the auxiliary AC/DC converter 3 to stop its operation.

As described above, when the DC system voltage Vdc is within a range greater than the independent operation threshold Vc (upper limit) or smaller than the independent operation threshold Vd (lower limit), the DC/DC converter 7 operates in the independent operation mode and outputs a power based on a value of the independent operation charge/discharge power command Pbat_ind. In this case, the division of roles in the output power between the auxiliary AC/DC converter 3 and the DC/DC converter 7 is determined on the basis of the relationship between the independent operation characteristic of the DC/DC converter 7 and the control gain K of the auxiliary AC/DC converter 3. For this reason, when the state of the load 5 changes suddenly, there may be a case where the load power and the power of the DC power supply 6 are balanced without the power of the auxiliary AC/DC converter 3 reaching Pm, depending on the setting of the independent operation thresholds Vc and Vd and the selection of the control gain K. In this case, if the DC power supply 6 continues to operate in the independent operation, there is a problem of running out of generated power.

To cope with this problem, the control gain K may be selected in such a way that the auxiliary AC/DC converter 3 outputs Pm at the stable voltages Va and Vb. Alternatively, after a certain period of operation of the DC/DC converter 7 in the independent operation mode, a forced switch to Operation Mode 1 may be performed. Instead, another configuration is also possible in which switching to Operation Mode 1 or reducing the output power takes place when the available power generation of the DC power supply 6 or a parameter associated with it falls below a threshold. This avoids the problem described above of running out of generated power.

In the following, specific examples will be used to illustrate this. For example, assume operation under the following conditions: the rated powers of the main AC/DC converter 2 and the DC/DC converter 7 are 100 kW; the rated power of the auxiliary AC/DC converter 3 is 30 kW; and the power required by the load is 40 kW, wherein the DC system voltage Vdc is within the stable voltage range and thus the power conversion unit 50 is operating in Operation Mode 2, so that, of the 40 kW required by the load, 20 kW is being supplied by the DC power supply 6 and the remaining 20 kW is being supplied by the auxiliary AC/DC converter 3.

At this moment, if the charge/discharge power command Pbat_ref of the DC power supply 6 is changed to 0 kW, then the auxiliary AC/DC converter 3 is required to increase the power supply to deliver 40 kW of power to the load. However, when the power supply exceeds the threshold Pm (for example, 25 kW), the operation is switched to Operation Mode 1 and the main AC/DC converter 2 starts to supply power. If the charge/discharge power command Pbat_ref is filtered by the command value filter 713, the output of the charge/discharge power by the DC power supply 6 according to this command value varies smoothly. This gives time to detect an increase in the output power by the auxiliary AC/DC converter 3 and to switch to the main AC/DC converter 2. If the charge/discharge power command Pbat_ref is not filtered by the command value filter 713, the increase in the output power by the auxiliary AC/DC converter 3 may not be in time. In this case, the DC system voltage Vdc decreases and the DC/DC converter 7 enters the independent operation mode, so that the DC power supply 6 must supply power to the DC system 4. In order to avoid such a variation in the DC system voltage, a limit may be set to the range of values of the charge/discharge power command Pbat_ref of the DC power supply 6 when switching from Operation Mode 1 to Operation Mode 2.

The operation when the load consumption surges to 60 kW while the DC power supply 6 is delivering 20 kW will be described. At this time, the auxiliary AC/DC converter 3 cannot satisfy the load power even though it outputs the rated power of 30 kW. Therefore, the DC system voltage Vdc will decrease, but the DC/DC converter 7 enters the independent operation mode and the DC power supply 6 starts to supply power to restore the DC system voltage Vdc. The power conversion unit 50 is switched from Operation Mode 2 to Operation Mode 1 while the DC power supply 6 is suppling power to the load 5. This makes it possible to switch the operation mode of the power conversion unit 50 without stopping the load 5.

However, if the operation mode is switched from Operation Mode 1 to Operation Mode 2 when the charge/discharge power command Pbat_ref is equal to the rated power Pdc of the DC/DC converter 7, the DC power supply 6 has no spare capacity to deliver additional charge/discharge power in the independent operation mode forced to enter by the sudden load change. In order for the DC power supply 6 to continue charging and discharging power even after the DC/DC converter 7 has switched its operation to the independent operation mode, an additional condition can be set so that the operation is switched to Operation Mode 2 only when the charge/discharge power command Pbat_ref is equal to or less than 80% of the rated power of the DC/DC converter 7.

If the DC power supply 6 consists only of a solar power generator, the only thing that can be done is to stop supplying power from the DC power supply 6 when the DC system voltage Vdc is too high, since it is impossible to charge the DC power supply 6 in order to draw power from the DC system. To cope with this, a possible countermeasure is to set the independent operation threshold Vc lower than the stable voltage Va.

The auxiliary AC/DC converter 3 contributes to improving credibility of the system as a redundant configuration. For example, if the main AC/DC converter 2 fails and stops, the power for the load is available from the auxiliary AC/DC converter 3 and the DC power supply 6, and the power for charging the DC power supply 6 is available from the auxiliary AC/DC converter 3.

As described so far, according to Embodiment 1, in the DC power supply and distribution system 100, the power conversion unit 50 includes the main AC/DC converter 2 and the auxiliary AC/DC converter 3 having a smaller capacity than the main AC/DC converter 2 for converting the power outputted from the AC system 1 into DC power, and the switching command generation unit 8 determines which one of the main AC/DC converter 2 and the auxiliary AC/DC converter 3 to be operated on the basis of the output power outputted by the power conversion unit 50 and the voltage of the DC system 4, and give instructions to the main AC/DC converter 2 and the auxiliary AC/DC converter 3. With this configuration, the DC power supply and distribution system 100 can improve the efficiency of power distribution even when the load factor is low.

In addition, the switching command generation unit 8 can change the independent operation threshold voltages Vc and Vd for controlling the operation of the DC/DC converter 7 which converts the charge/discharge power of the DC power supply 6 connected to the DC system 4. This configuration contributes to stable operation coping with sudden load changes and to the realization of a redundant configuration while avoiding upsizing of the DC power supply and distribution system 100.

Embodiment 2

(Configuration)

Figure 11:
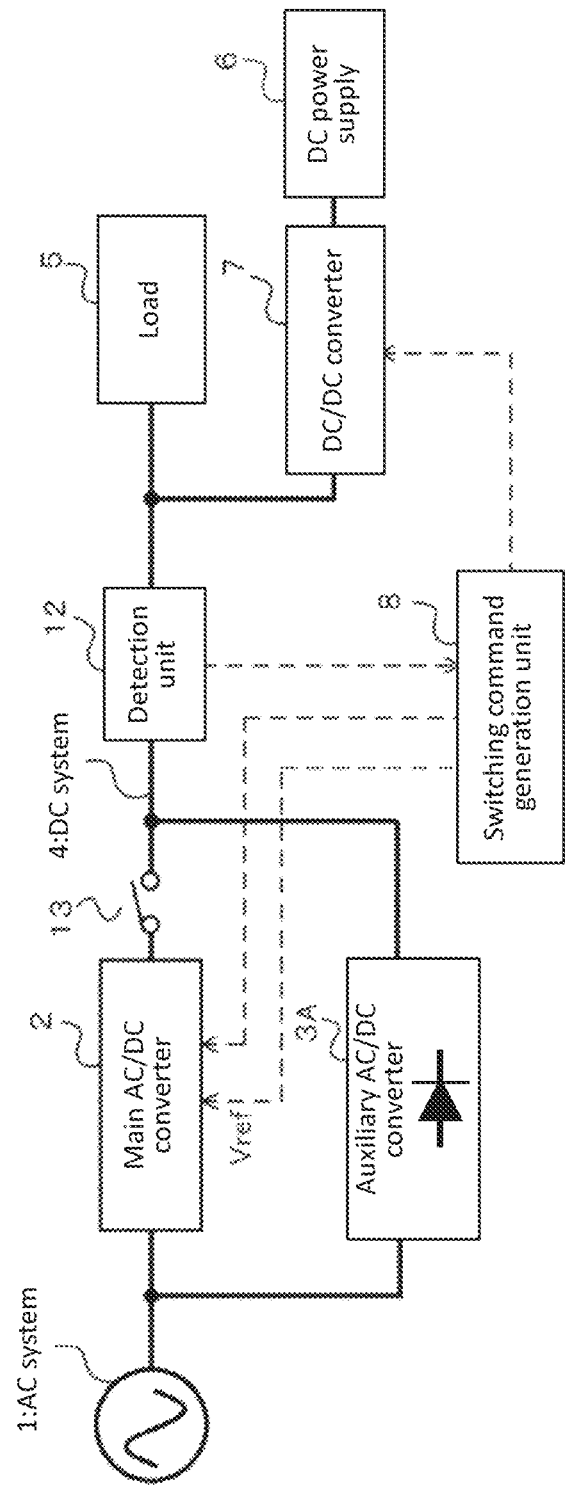
FIG. 11 is a schematic configuration diagram of a DC power supply and distribution system according to Embodiment 2 of the present disclosure.

FIG. 11 is a schematic configuration diagram of a DC power supply and distribution system according to Embodiment 2 of the present disclosure. Embodiment 2 differs from Embodiment 1 in that an auxiliary AC/DC converter 3A includes a diode rectifier.

The diode rectifier has the following primary characteristics:

The maximum value of the DC output voltage that the diode rectifier can output is an effective voltage Vac of the AC system 1 multiplied by the square root of two. This means that a given voltage value cannot always be outputted in accordance with the distribution voltage command Vref. In addition, only the power operation, in which power is supplied from the AC system 1 to the DC system 4, is possible, but the regenerative operation, in which power is supplied from the DC system 4 to the AC system 1, is not possible.

On the other hand, with the diode rectifier, the switching of the diode does not need to be controlled by a controller. Therefore, in the present embodiment, the switching frequency can be lowered compared to using the auxiliary AC/DC converter 3 in Embodiment 1. From the above, the AC/DC converter according to the present embodiment can achieve lower amount of loss and smaller size than those described in Embodiment 1. This leads to further downsizing and efficiency improvements in the DC power supply and distribution system.

(Operation)

Since the basic operation is the same as in Embodiment 1, the differences will be described here. In Embodiment 2, the diode rectifier is used as the auxiliary AC/DC converter 3A, so that a given DC voltage cannot always be outputted as described above. Therefore, if the distribution voltage command Vref of the main AC/DC converter 2 is greater than the Vac multiplied by the square root of two when the power conversion unit 50 is switched from Operation Mode 1 to Operation Mode 2, the DC system voltage Vdc decreases. Conversely, the DC system voltage Vdc increases when switching from Operation Mode 2 to Operation Mode 1. At this time, since the actual DC system voltage Vdc is lower than the command Vref to the main AC/DC converter 2, an excess current may flow to the main AC/DC converter 2.

To cope with this, when the main AC/DC 2 is stopped in Step S5 or when the main AC/DC 2 is started in Step S7, the distribution voltage command Vref is changed to match the output voltage (the DC system voltage Vdc) of the auxiliary AC/DC 3A. The simplest way to find the output voltage of the auxiliary AC/DC converter 3A is to obtain a steady-state value by the Vac multiplied by the square root of two, but the error with the actual output voltage may be large. Methods for error reduction include using the DC system voltage Vdc detected by a sensor and calculating the DC system voltage Vdc according to the output current based on pre-stored map information representing the relationship between the output current of the auxiliary AC/DC converter 3A and the DC system voltage Vdc.

In addition, when switching to Operation Mode 2, the switching command generation unit 8 changes the stable voltages Va and Vb in accordance with the steady-state output voltage of the auxiliary AC/DC converter 3A, and changes the independent operation voltage thresholds Vc and Vd to be closer to or equal to the changed stable voltages Va and Vb.

Figure 12:
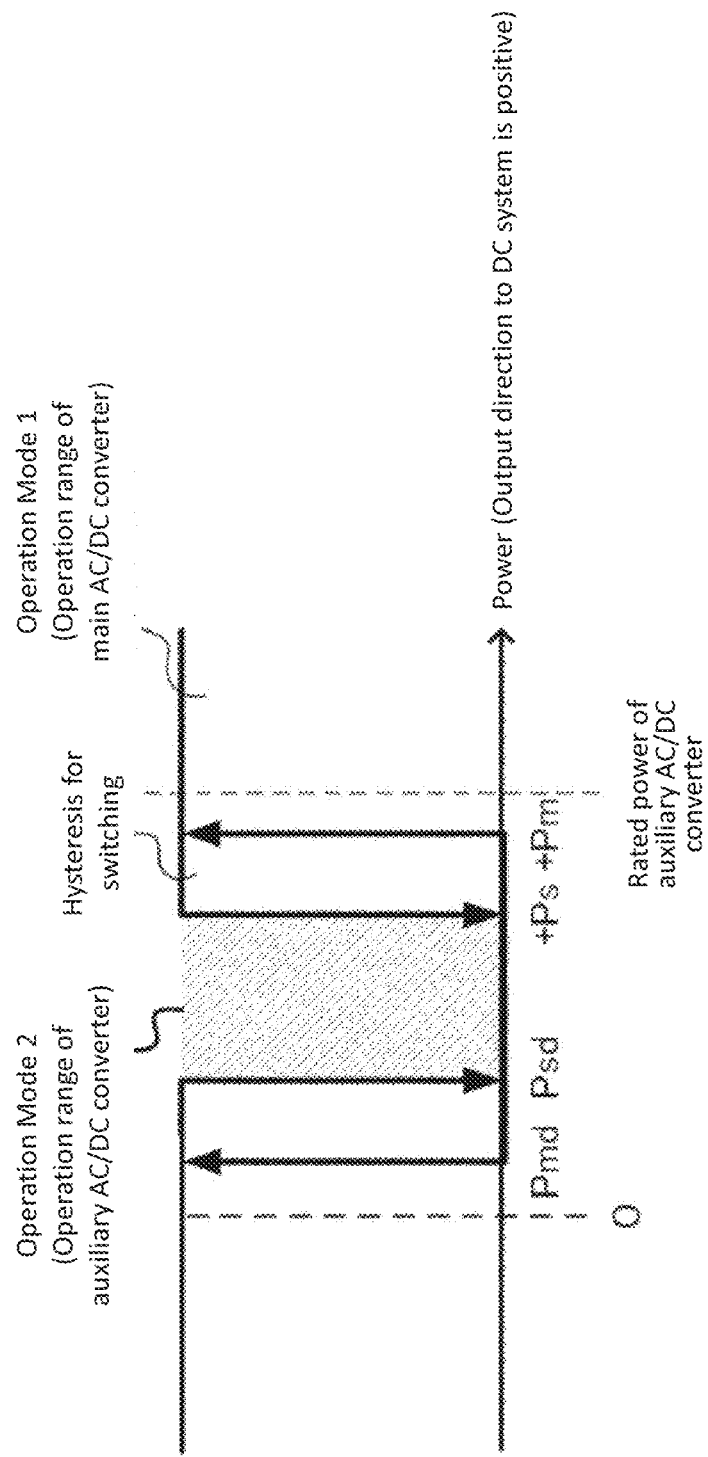
FIG. 12 is an explanatory diagram to illustrate switching thresholds of the main AC/DC converter and the auxiliary AC/DC converter according to Embodiment 2 of the present disclosure.

FIG. 12 is an explanatory diagram to illustrate the switching thresholds of the main AC/DC converter 2 and the auxiliary AC/DC converter 3A according to Embodiment 2 of the present disclosure. Since the diode rectifier cannot regenerate power to the AC system 1, in the figure the threshold powers −Ps and −Pm of the regenerative operation direction are set to values greater than 0, i.e., Psd and Pmd of the power operation direction.

In Operation Mode 2, in addition to the current flowing through the auxiliary AC/DC converter 3A, a current may flow through a parasitic diode in a semiconductor switch constituting the AC/DC conversion unit 22 of the main AC/DC converter 2. Therefore, the threshold powers Ps and Pm must also be set considering the current flowing through the parasitic diode included in the main AC/DC converter 2. For example, if the current sharing ratio is "one" for the main AC/DC converter 2 and "four" for the auxiliary AC/DC converter 3A, then when the auxiliary AC/DC converter 3A outputs Pm of power, the parasitic diode outputs Pm divided by "five" of power. In this case, Pm should be set such that the current flowing through the parasitic diode does not exceed the rated current.

In case of avoiding the current sharing described above, a switch 13, which may be a switch or a circuit breaker, etc., may be installed at the DC output terminal or at the AC input terminal of the main AC/DC converter 2 as shown in FIG. 11. In Operation Mode 2, the switch 13 can be opened to prevent power from being supplied to the DC system 4 via the parasitic diode. The switch 13 is closed when switching to Operation Mode 1. However, some configuration should be provided to prevent inrush current, for example, by matching the output voltage of the main AC/DC converter 2 to the DC system voltage Vdc before closing the switch 13.

Thus, according to Embodiment 2, the auxiliary AC/DC converter 3A includes the diode rectifier, and when the operation mode is switched, the stable voltage range from Va to Vb, the operating range for the independent operation from Vc to Vd, and the distribution voltage command Vref of the main AC/DC converter 2 are changed in accordance with the output voltage of the auxiliary AC/DC converter 3A.

The DC power supply and distribution system according to the present embodiment includes the auxiliary AC/DC converter 3A composed of a small low-loss diode, thereby enabling further improvement of the conversion efficiency in a low-load range and downsizing of the system.

Embodiment 3

(Configuration)

Figure 13:
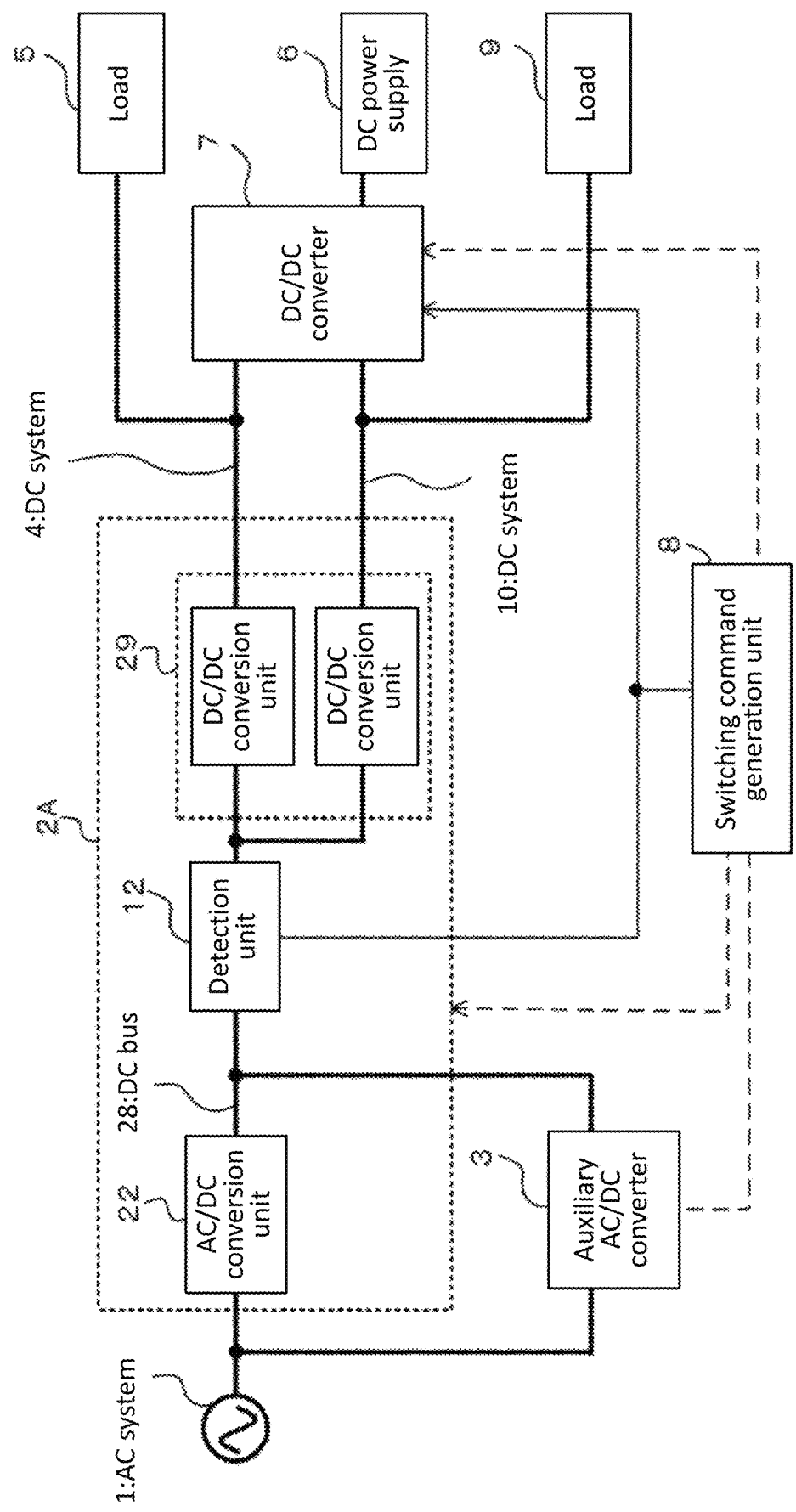
FIG. 13 is a schematic configuration diagram of a DC power supply and distribution system according to Embodiment 3 of the present disclosure.

FIG. 13 is a schematic configuration diagram of a DC power supply and distribution system according to Embodiment 3 of the present disclosure. The main AC/DC converter 2A according to Embodiment 3 includes an AC/DC conversion unit 22, a DC bus 28, and a DC/DC conversion unit 29 (corresponding to a second DC/DC conversion unit). The auxiliary AC/DC converter 3 is connected at its output terminal to the DC bus 28 so as to be in parallel with the AC/DC conversion unit 22.

The DC/DC conversion unit 29 is connected to a plurality of DC systems having different voltages, as shown by the DC system 4 and a DC system 10, each DC system being further connected to a load. The DC/DC converter 7 is configured to output the charge/discharge power of the DC power supply 6 to the plurality of DC systems, such as the DC system 4 and the DC system 10. The detection unit 12 detects the DC bus voltage as well as the output currents and the output powers of the AC/DC conversion unit 22 and the auxiliary AC/DC converter 3 to output the detected values to the switching command generation unit 8 and the DC/DC converter 7.

In FIG. 13, as an example, the main AC/DC converter 2A outputs a plurality of different DC voltages, but the voltages to be outputted may be of the same value, as in Embodiments 1 and 2.

(Operation)

Since the basic operation is the same as in Embodiment 1, only the differences are described here. In Embodiment 3, the main AC/DC converter 2A includes the AC/DC conversion unit 22 and the DC/DC conversion unit 29 as described above. The AC/DC conversion unit 22 and the DC/DC conversion unit 29 are connected via the DC bus 28.

The switching command generation unit 8 determines, as in Embodiment 1, which one of the AC/DC conversion unit 22 and the auxiliary AC/DC converter 3 is to be operated on the basis of the DC bus voltage detected by the detection unit 12 provided at the DC bus 28 and the DC output powers outputted by the AC/DC conversion unit 22 and the auxiliary AC/DC converter 3, to output an operation command.

Figure 14:
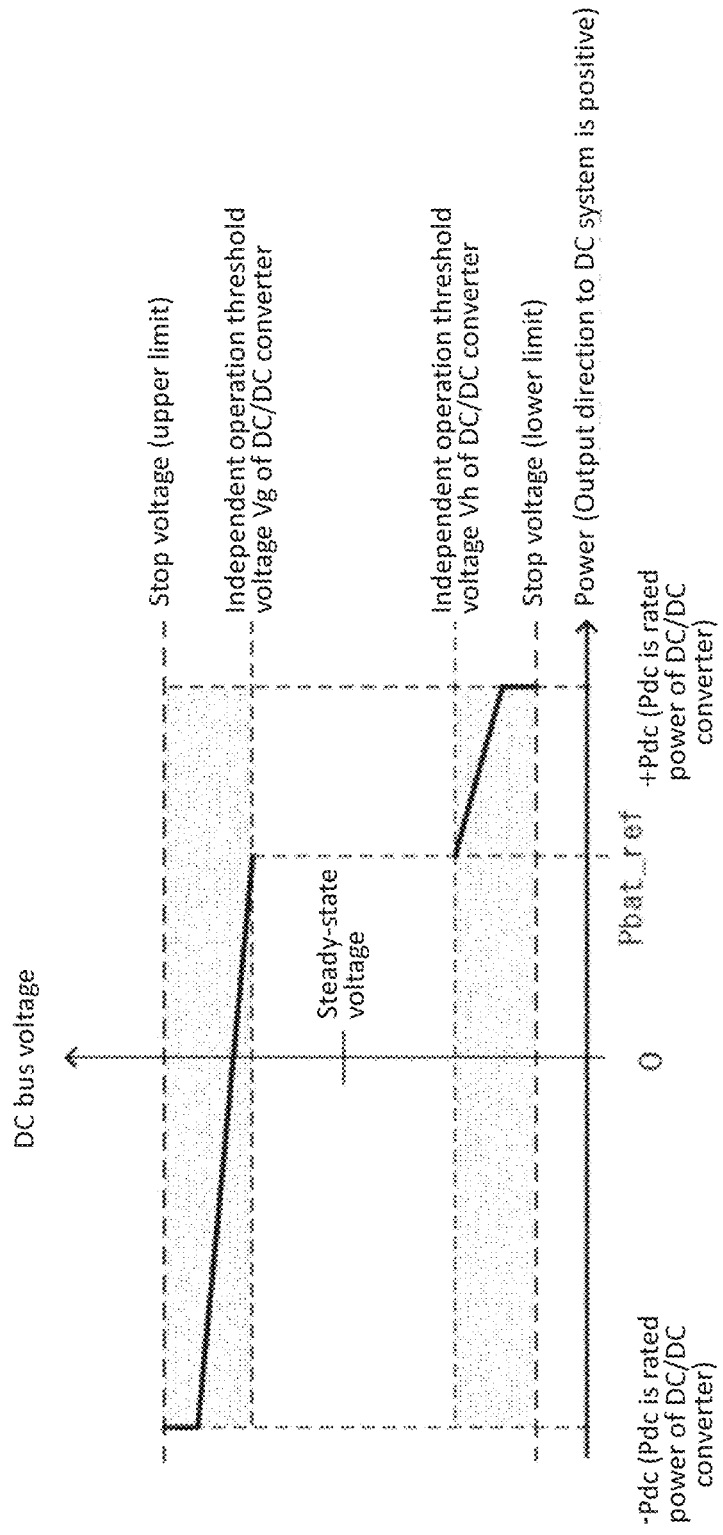
FIG. 14 is a characteristic diagram to illustrate independent operation control of a DC/DC converter according to Embodiment 3 of the present disclosure.

Here, the independent operation control of the DC/DC converter 7 according to the present embodiment will be described with reference to FIG. 14. FIG. 14 is a characteristic diagram to illustrate the independent operation control of the DC/DC converter 7 according to Embodiment 3 of the present disclosure. As for the stable voltages, the stable voltages Va and Vb are set for the DC bus 28. As for the independent operation threshold voltages of the DC/DC converter 7, the threshold voltages Vc and Vd are set for the DC system 4, the threshold voltages Ve and Vf are set for the DC system 10, and the threshold voltages Vg and Vh are set for the DC bus 28. That is, as shown in FIG. 14, the independent operation characteristic that is independent of the DC system 4 is also given to the voltage of the DC bus 28. When switching from Operation Mode 1 to Operation Mode 2, the independent operation threshold voltages Vg and Vh of the DC bus 28 are changed so as to be closer to or equal to the stable voltages Va and Vb, respectively.

In other words, when the voltage of the DC bus 28 is not within a range between the threshold voltages Vh and Vg shown in FIG. 14 (this range corresponds to a second voltage range), the DC/DC conversion unit 72 supplies the charge/discharge power from the DC power supply 6 to the DC bus 28 so that the voltage of the DC bus 28 fits into the second voltage range. When switching to Operation Mode 2 as described above, the independent operation threshold voltages Vc and Vd for the DC system 4 and the independent operation threshold voltages Ve and Vf (not shown) for the DC system 10 do not need to be changed.

The switching command generation unit 8 performs operation switching between the AC/DC conversion unit 22 and the auxiliary AC/DC converter 3 on the basis of the voltage and the power detected by the detection unit (the sensor units) connected to the DC bus 28 and narrows the second voltage range. That is, the threshold voltages Vg and Vh are brought closer to or equal to the stable voltages Va and Vb, respectively.

Figure 15:
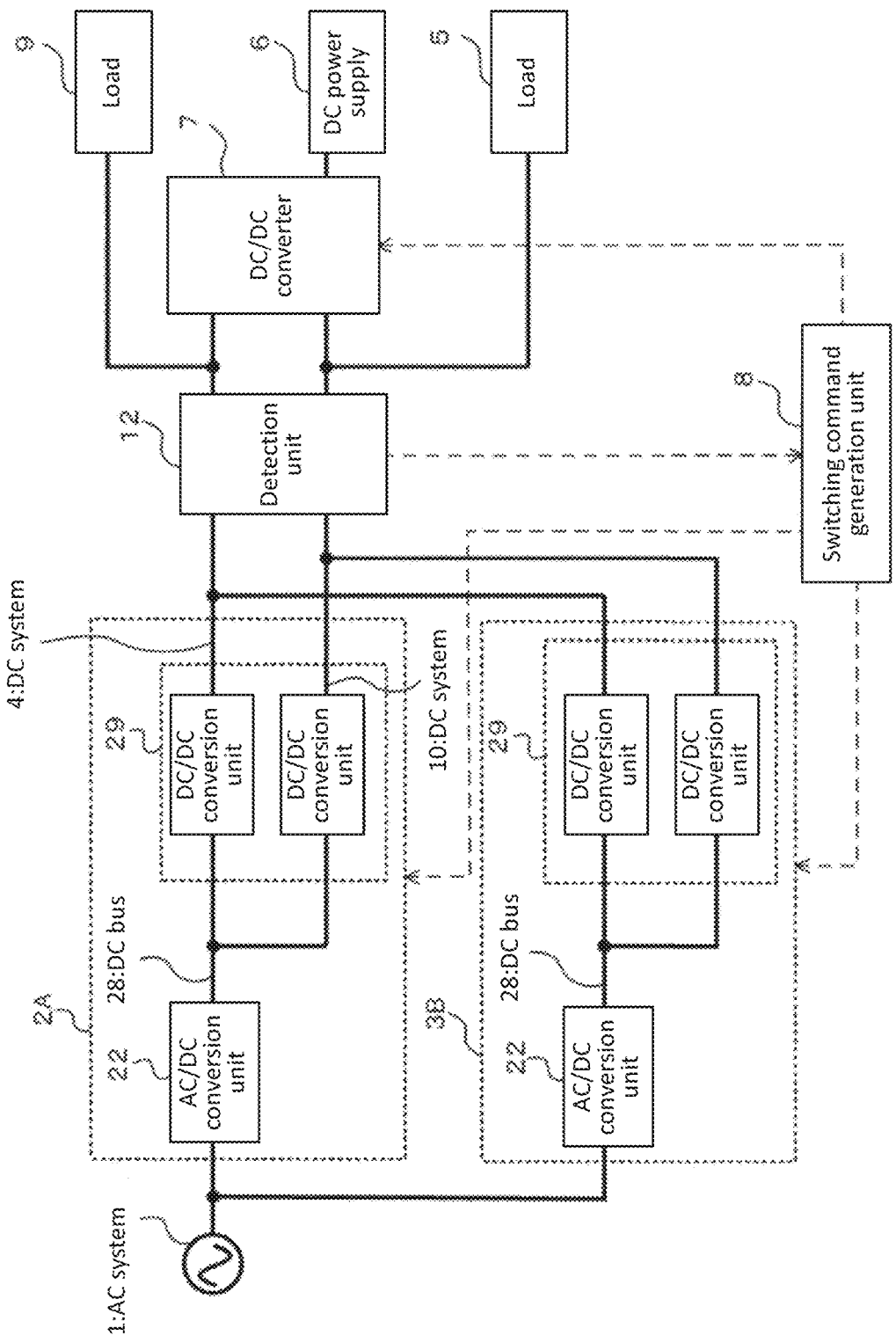
FIG. 15 is a schematic configuration diagram of a modification of the DC power supply and distribution system according to Embodiment 3 of the present disclosure.

FIG. 15 is a schematic configuration diagram of a modification of the DC power supply and distribution system according to Embodiment 3 of the present disclosure. As shown in FIG. 15, the main AC/DC converter 2A includes the DC/DC conversion unit 29 capable of providing a plurality of DC outputs. The auxiliary AC/DC converter 3B also includes the DC/DC conversion unit 29 capable of providing a plurality of DC outputs. As in Embodiment 1, the main AC/DC converter 2A and the auxiliary AC/DC converter 3B are connected in parallel.

In this case, for example, if the load factor of the DC system 4 alone is low among the plurality of DC systems, it is possible to stop only the DC/DC conversion unit to the DC system 4 in the main AC/DC converter 2A, to start operating the DC/DC converter conversion unit connected to the AC/DC conversion unit 22 and the DC system 4 in the auxiliary AC/DC converter 3B, and to narrow the operating range for the heteronomous operation of this DC/DC conversion unit.

As described above, according to Embodiment 3, even in a case where the main AC/DC converter 2A includes the AC/DC conversion unit 22, the DC bus 28, and the DC/DC conversion unit 29, it is possible to connect the auxiliary AC/DC converter 3 (or 3B) to the AC/DC conversion unit 22 of the main AC/DC converter 2A in parallel and to switch the operation between the main converter and the auxiliary converter.

As shown in FIG. 13, only the AC/DC conversion unit 22 of the main AC/DC converter 2A is connected in parallel with the auxiliary AC/DC converter 3. This configuration provides high efficiency in low load operation and redundancy while preventing oversizing of the DC power supply and distribution system, even when the main AC/DC converter 2A has a complex configuration, such as multiple voltage outputs.

Figure 16:
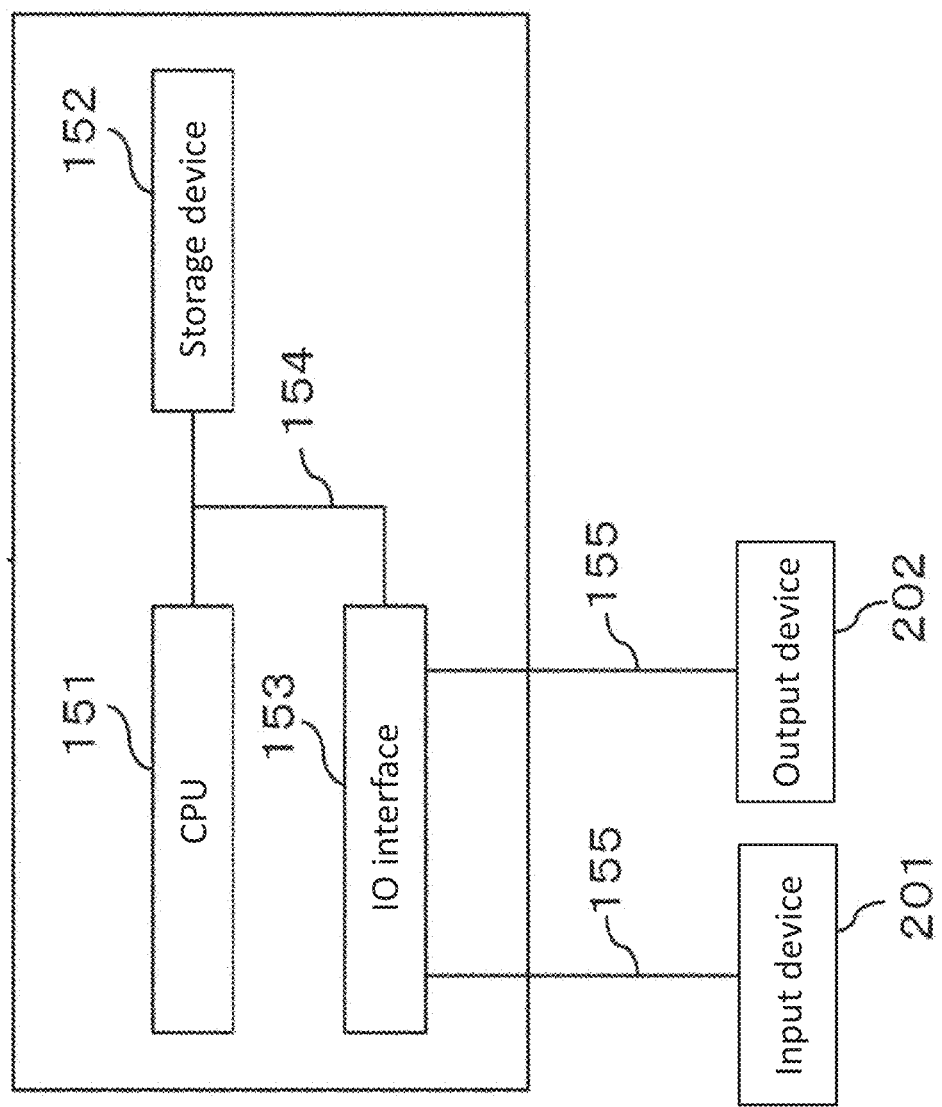
FIG. 16 is a schematic configuration diagram of hardware included in the DC power supply and distribution system according to the embodiments of the present disclosure.

FIG. 16 is a schematic configuration diagram of hardware of the switching command generation unit 8 according to Embodiments 1 to 3 of the present disclosure. Controlling units of the DC power supply and distribution system (the switching command generation unit 8, the AC/DC conversion control unit 21, the distribution voltage command generation unit 200, and the charge/discharge power command generation unit 700) include in particular, as a whole or in part, a central processing unit (CPU) 151, a storage device 152, an input output interface (IO interface) 153, and a system bus 154. The storage device 152 includes a read only memory (ROM), a hard disk drive (HDD), or the like. The IO interface 153 of the switching command generation unit is connected to the input device 201 and the output device 202 via cables 155. Each process of the controlling units to control the DC power supply and distribution system is executed by the CPU 151. The storage device 152 stores parameters (for example, the threshold powers, the independent operation threshold voltages, etc.) to be used by the controlling units of the DC power supply and distribution system. These parameters may be inputted externally via the input device 201 instead of being stored in advance in the storage device 152. The output device 202 may display these parameters, the operation modes, etc.

So far, the DC power supply and distribution system according to Embodiments 1 to 3 of the present disclosure has been described, but these embodiments are presented as examples and are not intended to limit the scope of the invention. These novel embodiments may be implemented in various other forms, including various omissions, substitutions, and modifications, so long as they do not depart from the gist of the invention. These embodiments and variations thereof are included not only within the scope and gist of the invention, but also within the inventions and its equivalents described in the claims.

DESCRIPTION OF SYMBOLS

A . . . connection point
B . . . connection point
1 . . . AC system
2 . . . main AC/DC converter
3 . . . auxiliary AC/DC converter
4 . . . DC system
5 . . . load
6 . . . DC power supply
7 . . . DC/DC converter
8 . . . switching command generation unit
9 . . . load
10 . . . DC system
12 . . . detection unit
13 . . . switch
200 . . . distribution voltage command generation unit
21 AC/DC conversion control unit
22 . . . AC/DC conversion unit
23A, 23B . . . sensor units
28 . . . DC bus
29 . . . DC/DC conversion unit
50 . . . power conversion unit
700 . . . charge/discharge power command generation unit
71 . . . DC/DC conversion control unit
72 . . . DC/DC conversion unit
73A, 73B . . . sensor units
100 . . . DC power supply and distribution system
211 . . . AC/DC output control unit
212 . . . DC voltage control unit
213 . . . command value filter
711 . . . DC/DC output control unit
712 . . . charge/discharge power control unit
713 . . . command value filter
714 . . . independent operation control unit

The invention claimed is:

1. A DC power supply and distribution system comprising:
a power converter including a main AC/DC converter and an auxiliary AC/DC converter connected in parallel to the main AC/DC converter and characterized by a rated power capacity smaller than that of the main AC/DC converter for converting AC power inputted from an AC system into DC power to output it to a DC system;
switching command generating circuitry for controlling the power converter on the basis of DC output power outputted by the power converter; and
a DC/DC converter including a first DC/DC converting circuitry connected to the DC system and a DC power supply, and DC/DC conversion controlling circuitry for controlling the first DC/DC converting circuitry,
wherein under an assumption that an operation mode in which the main AC/DC converter is in an operating state and the auxiliary AC/DC converter is in a stopped state is a first operation mode, and an operation mode in which the main AC/DC converter is in a stopped state and the auxiliary AC/DC converter is in an operating state is a second operation mode, when the power converter is in the first operation mode and an absolute value of the DC output power outputted by the power converter is smaller than an absolute value of a threshold power set smaller than the rated power capacity of the auxiliary AC/DC converter, the switching command generating circuitry generates, for the power converter, a first switching command that is a switching command for switching from the first operation mode to the second operation mode, and when a voltage of the DC system is outside a preset first voltage range, the DC/DC conversion controlling circuitry controls the first DC/DC converting circuitry so as to supply charge/discharge power from the DC power supply to the DC system in such a way the voltage of the DC system is within the first voltage range.

2. The DC power supply and distribution system according to claim 1, wherein, when the power converter is in the second operation mode and the DC output power outputted by the power converter is equal to or greater than the threshold power, the switching command generating circuitry generates a second switching command for switching from the second operation mode to the first operation mode.

3. The DC power supply and distribution system according to claim 2, wherein the threshold power includes a first threshold power used for generating the first switching command and a second threshold power used for generating the second switching command, and an absolute value of the second threshold power is set greater than an absolute value of the first threshold power.

4. The DC power supply and distribution system according to claim 1, wherein, when the absolute value of the DC output power outputted by the power converter is smaller than the absolute value of the threshold power, the switching command generating circuitry instructs the DC/DC conversion controlling circuitry to set a voltage range narrower than the first voltage range as the first voltage range.

5. The DC power supply and distribution system according to claim 1, wherein, when the absolute value of the DC output power outputted by the power converter is equal to or greater than the absolute value of the threshold power, the switching command generating circuitry instructs the DC/DC conversion controlling circuitry to set a voltage range wider than the first voltage range as the first voltage range.

6. The DC power supply and distribution system according to claim 1, wherein, when the absolute value of the DC output power outputted by the power converter is smaller than the absolute value of the threshold power, and the voltage of the DC system is within a stable voltage range, which is a voltage range of the DC system in which the DC power supply and distribution system can operate stably, the switching command generating circuitry switches the operation mode from the first operation mode to the second operation mode and changes the first voltage range to the stable voltage range.

7. The DC power supply and distribution system according to claim 1, wherein the auxiliary AC/DC converter includes a diode rectifier, and wherein, when the auxiliary AC/DC converter is in an operating state, the switching command circuitry sets a DC voltage target value Vref of the main AC/DC converter to an output voltage of the auxiliary AC/DC converter.

8. The DC power supply and distribution system according to claim 1, wherein the main AC/DC converter includes an AC/DC converting circuitry and a second DC/DC converting circuitry connected to the AC/DC converting circuitry via a DC bus, wherein the auxiliary AC/DC converter is connected in parallel to the AC/DC converting circuitry of the main AC/DC converter, and wherein, when a voltage of the DC bus is not within a preset second voltage range, the first DC/DC converting circuitry supplies the charge/discharge power from the DC power supply to the DC bus via the second DC/DC converting circuitry so that the voltage of the DC bus fits into the second voltage range, and the switching command generating circuitry generates the first switching command on the basis of the output power outputted by the power converter detected by a sensor provided to the DC bus and changes to narrow the second voltage range.

* * * * *